United States Patent
Ito et al.

(10) Patent No.: US 7,612,823 B2
(45) Date of Patent: Nov. 3, 2009

(54) CONTROL APPARATUS, CONTROL METHOD, COMPUTER PROGRAM, AND CAMERA

(75) Inventors: Yujiro Ito, Kanagawa (JP); Hidekazu Suto, Tokyo (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 577 days.

(21) Appl. No.: 11/376,342

(22) Filed: Mar. 16, 2006

(65) Prior Publication Data

US 2006/0232696 A1    Oct. 19, 2006

(30) Foreign Application Priority Data

Apr. 15, 2005    (JP)    ............... 2005-118347

(51) Int. Cl.
*H04N 5/232*    (2006.01)
(52) U.S. Cl. ........................ 348/345; 348/349
(58) Field of Classification Search ............ 348/208.11, 348/208.12, 223.1, 345
See application file for complete search history.

(56) References Cited

U.S. PATENT DOCUMENTS

| | | | | |
|---|---|---|---|---|
| 5,064,538 A * | 11/1991 | Boeteng | ............... | 210/638 |
| 5,923,371 A * | 7/1999 | Iijima | ............... | 348/356 |
| 6,798,455 B1 * | 9/2004 | Abe | ............... | 348/353 |
| 6,972,798 B1 * | 12/2005 | Takei | ............... | 348/349 |
| 7,024,107 B2 * | 4/2006 | Takei | ............... | 396/125 |
| 2004/0196401 A1 * | 10/2004 | Kikuchi | ............... | 348/345 |

FOREIGN PATENT DOCUMENTS

| | | |
|---|---|---|
| JP | 6-268896 | 9/1994 |
| JP | 8-294035 | 11/1996 |
| JP | 9-9132 | 1/1997 |
| JP | 10-161016 | 6/1998 |
| JP | 10-215403 | 8/1998 |
| JP | 10-224682 | 8/1998 |
| JP | 2001-249266 | 9/2001 |
| JP | 2004-309653 | 11/2004 |
| WO | WO97/25812 | 7/1997 |

* cited by examiner

*Primary Examiner*—Nhan T Tran
*Assistant Examiner*—Trung Diep
(74) *Attorney, Agent, or Firm*—Oblon, Spivak, McClelland, Maier & Neustadt, L.L.P.

(57) ABSTRACT

A control apparatus for controlling a driver driving an optical element of an image pickup device to adjust a focus position of the image pickup device in the capturing of an image of a subject, includes a local peak comparing unit for comparing a local peak of an assessment value, as a parameter for adjusting the focus position, with a local peak of an integrated luminance value, the assessment value assessing an out-of-focus level of the captured image of the subject on a per field image basis, and the integrated luminance value being obtained by integrating a luminance value of the captured image of the subject on a per field image basis, and a mode selecting unit for selecting, from among a plurality of prepared modes, a mode searching for a peak over the entire range of the assessment value based on the comparison result provided by the local peak comparing unit.

10 Claims, 24 Drawing Sheets

FIG. 3

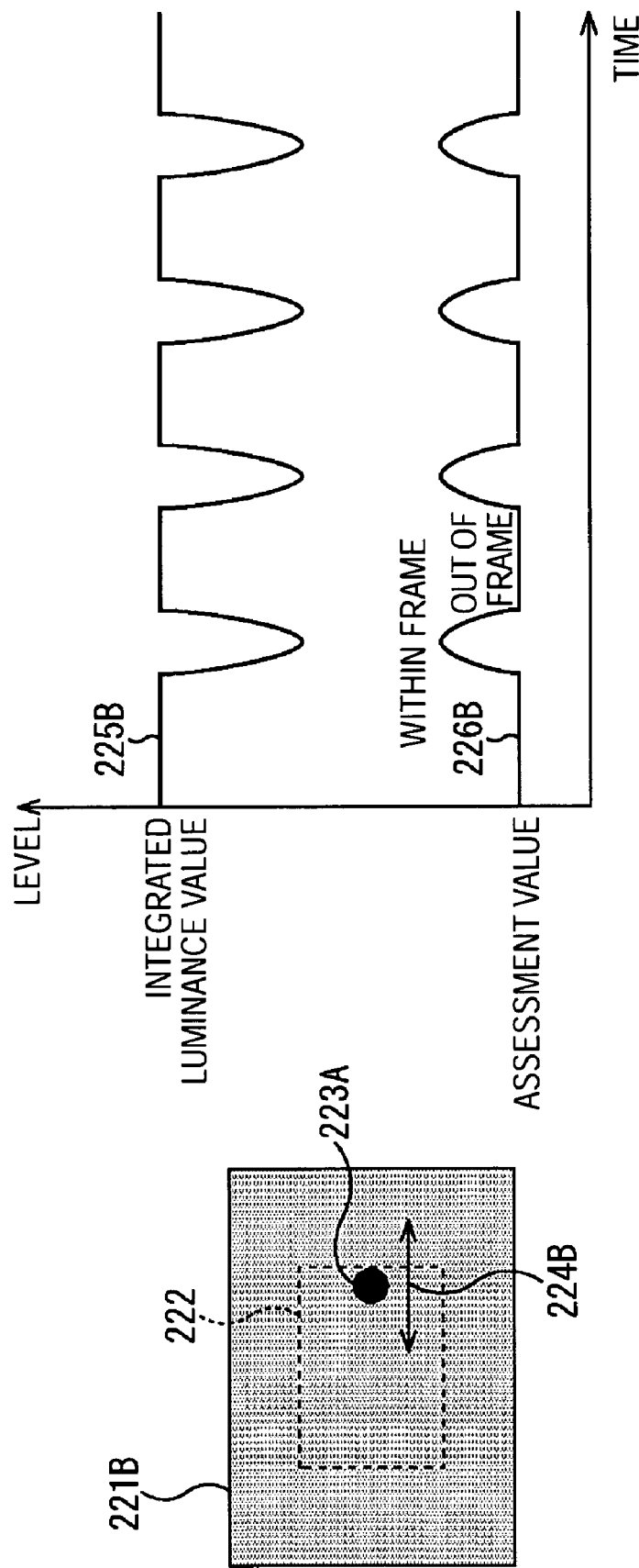

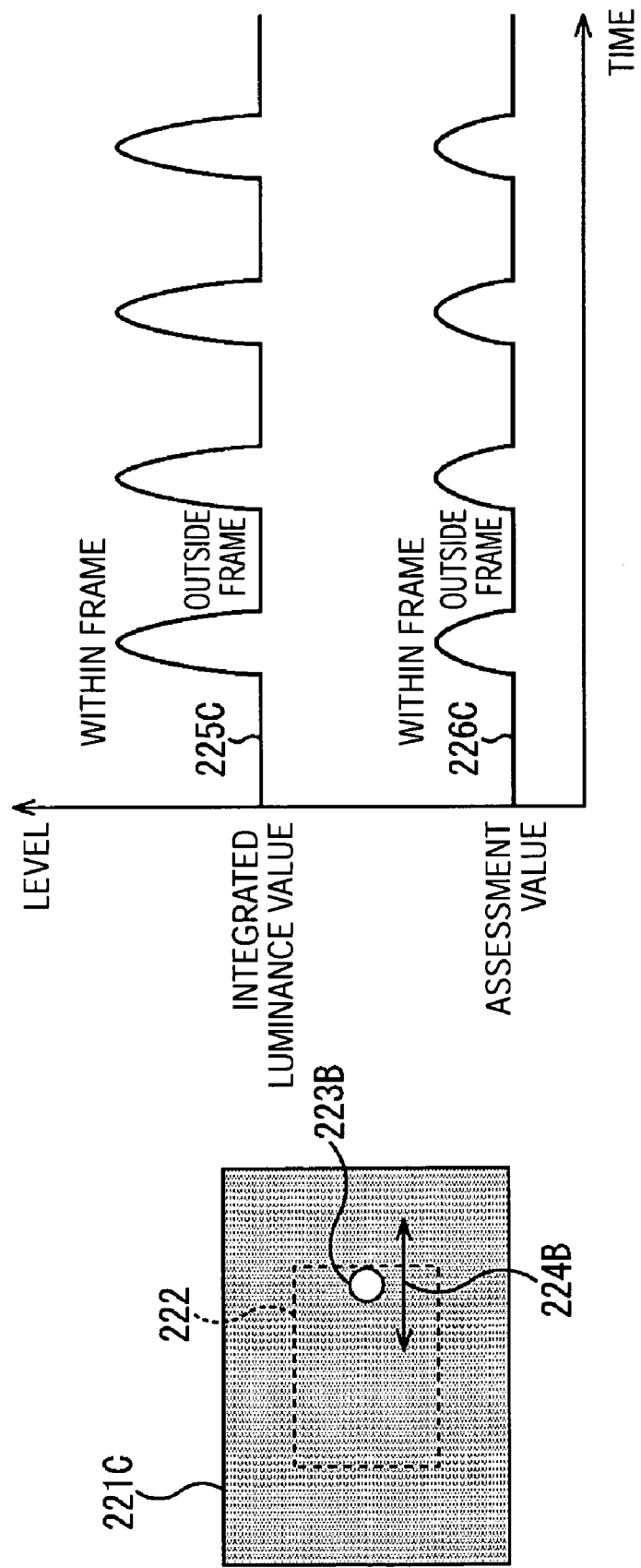

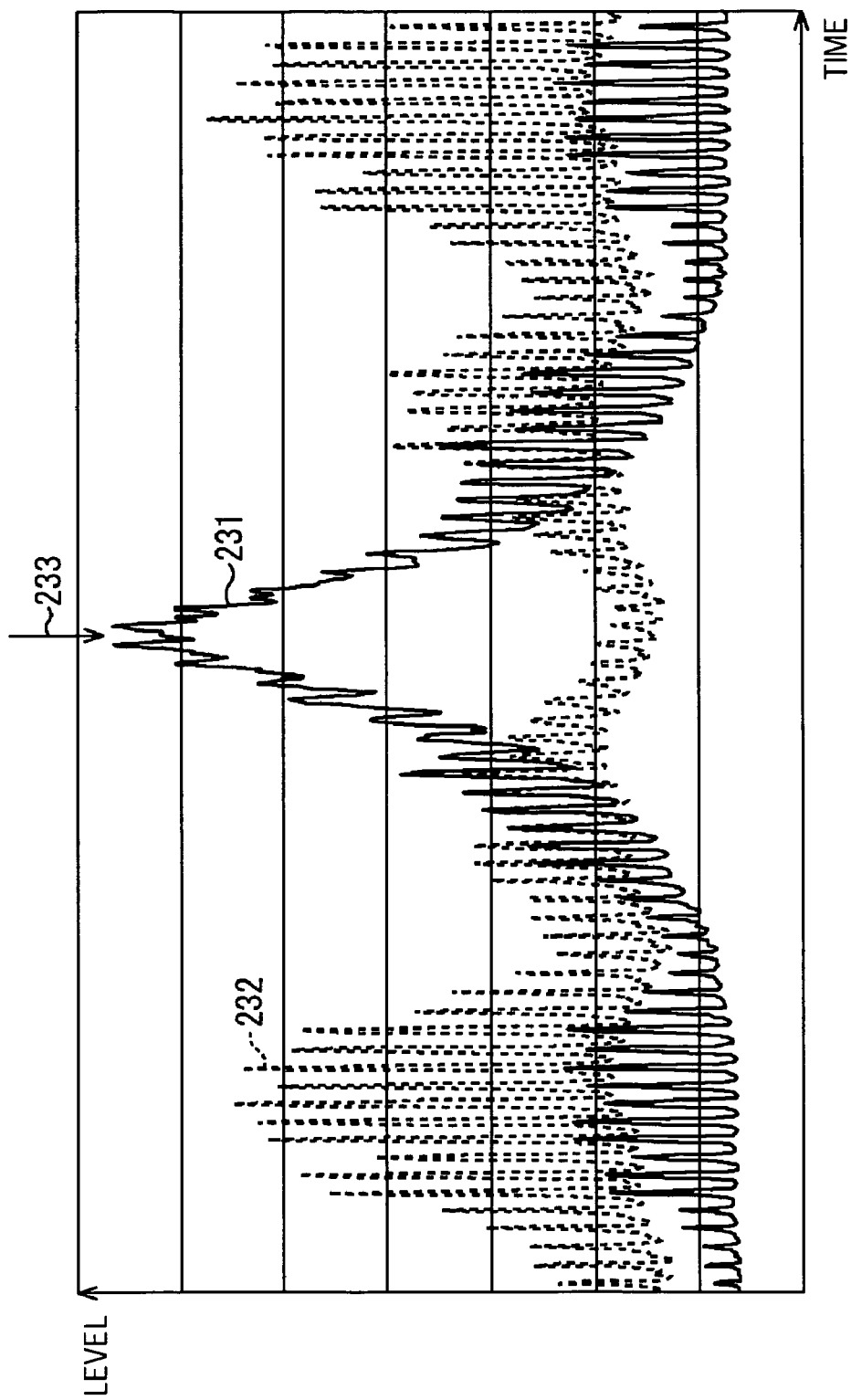

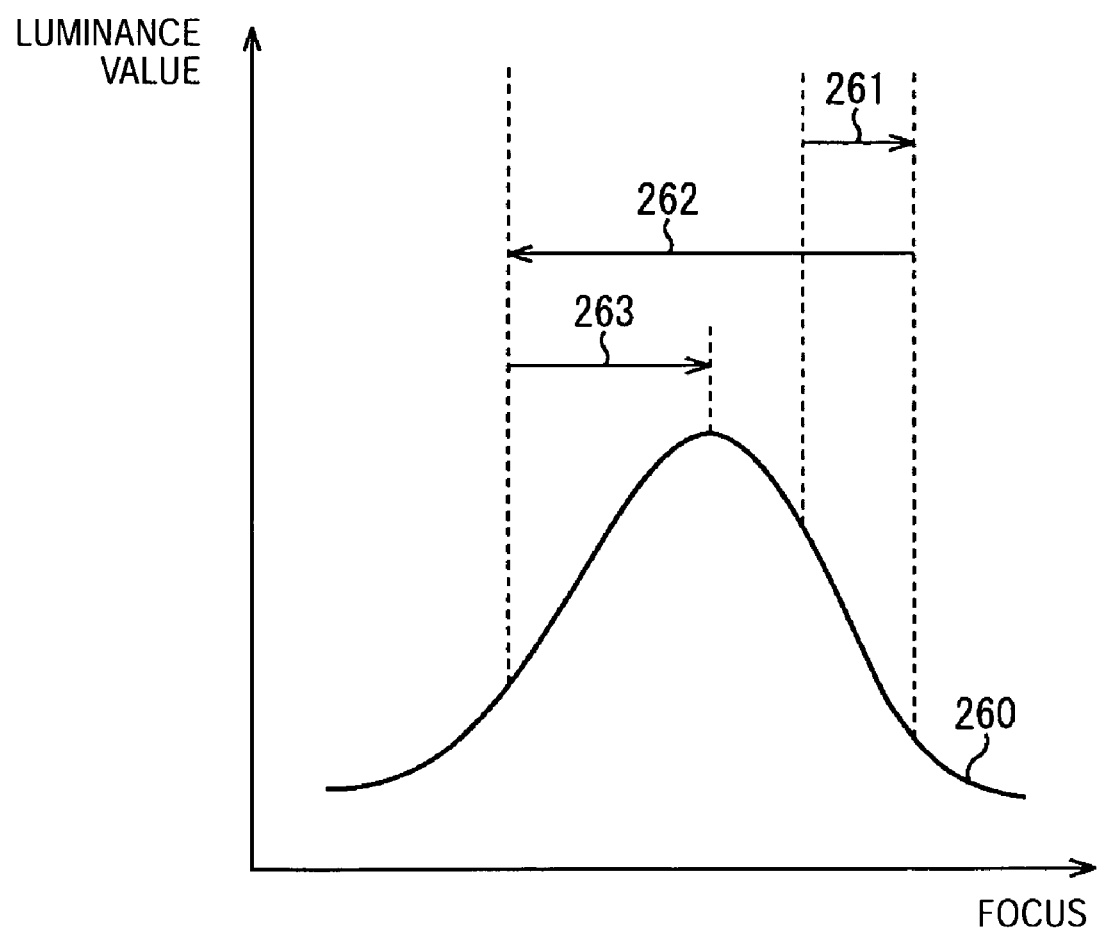

CONTROL APPARATUS, CONTROL METHOD, COMPUTER PROGRAM, AND CAMERA

CROSS REFERENCES TO RELATED APPLICATIONS

The present invention contains subject matter related to Japanese Patent Application JP 2005-118347 filed in the Japanese Patent Office on Apr. 15, 2005, the entire contents of which are incorporated herein by reference.

BACKGROUND OF THE INVENTION

1. Field of the Invention

The present invention relates to a control apparatus, a control method, a computer program, and a camera. More particularly, the present invention relates to a control apparatus, a control method, a computer program, and a camera for determining accurately a subject to perform more appropriately auto-focus control process.

2. Description of the Related Art

Known image pickup apparatuses are typically provided with an auto-focus (AF) function to automatically focus on a subject. International Patent Publication No. WO 97/25812 discloses a technique of AF process that detects a contrast of a captured image of a subject, and adjusts the position of a lens to reach the highest contrast (image processing technique).

The image pickup apparatus calculates an assessment value, as a parameter assessing an out-of-focus level of an image, within a predetermined area (assessment frame) in a captured image from the contrast of the image (for example, high-frequency component of a luminance value), searches the maximum assessment value (peak value) while shifting focus position, and focuses on the subject at a position where the peak value is attained. In this way, the image pickup apparatus is accurately in focus on the subject within the field of view thereof.

In such an image processing technique, the accuracy of focus largely depends on conditions of a photographing environment and a subject (content of a photographed image). A variety of techniques has been contemplated to achieve more reliable AF process. For example, Japanese Unexamined Patent Application Publication No. 10-215403 discloses one technique in which a lens is wobbled within a tiny range to efficiently search for an optimum focus position and, and the direction of movement of the lens is determined based on an assessment value of the captured image. Japanese Unexamined Patent Application Publication No. 10-161016 discloses another technique. According to the disclosure, the size of an assessment frame within which an assessment value is calculated is modified based on conditions so that an optimum AF process is performed within a wide range of photographing conditions.

A subject may be a special one that instantaneously and intensively lights with a sharp luminance change involved on a periodical or non-periodical basis. Such a subject may include one of a mirror ball and sunlight dappled through leaves of trees. Standard peak search technique, if applied to such a subject, is subject to peak detection error and has difficulty in accurately focusing the subject. The long-filter mode is available as a peak search technique applied to such a special subject. In the long-filer mode search technique, long moving averages of an luminance additive value and an assessment value are calculated with the lens moving at a constant speed, and the lens is returned to a location where the moving average is maximized.

The long-filter mode peak search technique can reduce the probability of erroneous operation (with AF process ending at an out-of-focus position) even on the special subject that sharply varies in the assessment value thereof.

SUMMARY OF THE INVENTION

With the long-filter mode peak search technique, however, the focus position is moved greatly. If the long-filter mode peak search technique is applied to an ordinary subject (other than the subject that instantaneously and intensively lights with a sharp luminance change involved on a periodical or non-periodical basis), a resulting image becomes long-time and out-of-focus, thereby causing a viewer to feel odd about. Preferably, the long-filter mode peak search technique is limited to the subject that instantaneously and intensively lights with a sharp luminance change involved on a periodical or non-periodical basis, and not applied to the ordinary subject. More specifically, the use of the long-filter mode peak search technique involves a proper determination method as to whether the subject is a special subject or not.

FIG. 1 shows a plot of variations of an integrated luminance value measured when a camera photographs a mirror ball that turns while instantaneously lighting. FIG. 2 shows a plot of variations of the integrated luminance value measured when the camera photographs a flower that is oscillating in large displacement. More specifically, FIG. 1 is a plot illustrating the variations of the integrated luminance value of a special subject, while FIG. 2 illustrates a plot illustrating the variations of the integrated luminance value of an ordinary subject. As shown in FIGS. 1 and 2, the integrated luminance value greatly varies with time.

Conventionally, the determination of a subject (of whether the subject is special or not) is performed based on the magnitude of the variations of the integrated luminance value alone. In such a case, the variations in FIG. 1 and the variations in FIG. 2 cannot be discriminated from each other. More specifically, known determination techniques have difficulty in the determination of the subjects. Even when the flower largely oscillating is photographed as shown in FIG. 2, the long-filter mode peak search technique is applied, and the focus position varies greatly in position, leading to an undesirable image.

It is thus desirable to perform a more appropriate AF control process with the aid of a more accurate subject determination.

A control apparatus of one embodiment of the present invention includes a local peak comparing unit for comparing a local peak of an assessment value, as a parameter for adjusting a focus position, with a local peak of an integrated luminance value, the assessment value assessing an out-of-focus level of a captured image of a subject on a per field image basis, and the integrated luminance value being obtained by integrating a luminance value of the captured image of the subject on a per field image basis, and a mode selecting unit for selecting, from among a plurality of prepared modes, a mode searching for a peak over the entire range of the assessment value based on the comparison result provided by the local peak comparing unit.

Preferably, the local peak comparing unit compares the local peak of the assessment value with the local peak of the integrated luminance value in terms of peak position and peak count.

Preferably, the mode selecting unit identifies the subject as a special subject instantaneously emitting light and selects a mode corresponding to the special subject if the local peak of the assessment value matches the local peak of the integrated luminance value in terms of peak position and peak count, and identifies the subject as an ordinary subject and selects a mode corresponding to the ordinary subject if the local peak of the assessment value fails to match the local peak of the integrated luminance value in terms of peak position and peak count.

Preferably, the special subject includes one of a mirror ball and sunlight dappled through leaves of trees.

Preferably, the mode corresponding to the special subject includes a long-filter mode for calculating a moving average of a normalized luminance assessment value on a per field basis.

Preferably, the control apparatus further includes an assessment value calculating unit for calculating the assessment value, and an integrated luminance value calculating unit for calculating the integrated luminance value. The local peak comparing unit compares the local peak of the assessment value calculated by the assessment value calculating unit with the local peak of the integrated luminance value calculated by the integrated luminance value calculating unit.

Preferably, the control apparatus further includes an assessment value local peak detecting unit for detecting the local peak of the assessment value calculated by the assessment value calculating unit, and an integrated luminance value local peak detecting unit for detecting the local peak of the integrated luminance value calculated by the integrated luminance value calculating unit. The local peak comparing unit compares the local peak of the assessment value detected by the assessment value local peak detecting unit with the local peak of the integrated luminance value detected by the integrated luminance value local peak detecting unit.

Preferably, the control apparatus further includes a peak search unit for searching for a peak over the entire range of the assessment value in a mode selected by the mode selecting unit.

A control method of one embodiment of the present invention includes steps of comparing a local peak of an assessment value, as a parameter for adjusting the focus position, with a local peak of an integrated luminance value, the assessment value assessing an out-of-focus level of a captured image of a subject on a per field image basis, and the integrated luminance value being obtained by integrating a luminance value of the captured image of the subject on a per field image basis, and selecting, from among a plurality of prepared modes, a mode searching for a peak over the entire range of the assessment value based on the comparison result provided in the local peak comparison step.

A computer program product of one embodiment of the present invention includes steps of comparing a local peak of an assessment value, as a parameter for adjusting the focus position, with a local peak of an integrated luminance value, the assessment value assessing an out-of-focus level of a captured image of a subject on a per field image basis, and the integrated luminance value being obtained by integrating a luminance value of the captured image of the subject on a per field image basis, and selecting, from among a plurality of prepared modes, a mode searching for a peak over the entire range of the assessment value based on the comparison result provided in the local peak comparison step.

A camera of one embodiment of the present invention includes a local peak comparing unit for comparing a local peak of an assessment value, as a parameter for adjusting the focus position, with a local peak of an integrated luminance value, the assessment value assessing an out-of-focus level of the captured image of the subject on a per field image basis, and the integrated luminance value being obtained by integrating a luminance value of the captured image of the subject on a per field image basis, a mode selecting unit for selecting, from among a plurality of prepared modes, a mode searching for a peak over the entire range of the assessment value based on the comparison result provided by the local peak comparing unit, and a peak searching unit for searching for the peak over the entire range of the assessment value by controlling the driver in the mode selected by the mode selecting unit.

In accordance with embodiments of the present invention, the local peak of the assessment value, as the parameter for adjusting the focus position, assessing the out-of-focus level of the captured image of the subject on a per field image basis, is compared with the local peak of the integrated luminance value being obtained by integrating the luminance value of the captured image of the subject on a per field image basis. From among the plurality of prepared modes, the mode searching for the peak over the entire range of the assessment value is selected based on the comparison result provided by the local peak comparing unit.

In accordance with embodiments of the present invention, the determination of the subject is accurately performed, leading a more appropriate AF control process.

BRIEF DESCRIPTION OF THE DRAWINGS

FIG. 3 illustrates an image pickup apparatus in accordance with one embodiment of the present invention;

FIGS. 12A and 12B show a plot of a dark subject in the photographed image that repeatedly enters and leaves an assessment frame;

FIGS. 13A and 13B show a plot of a bright subject in the photographed image that repeatedly enters and leaves an assessment frame;

FIG. 14 illustrates data of a mirror ball that is photographed as a subject;

FIG. 18 illustrates a waveform with peaks synchronized;

DESCRIPTION OF THE PREFERRED EMBODIMENTS

Figure 1:
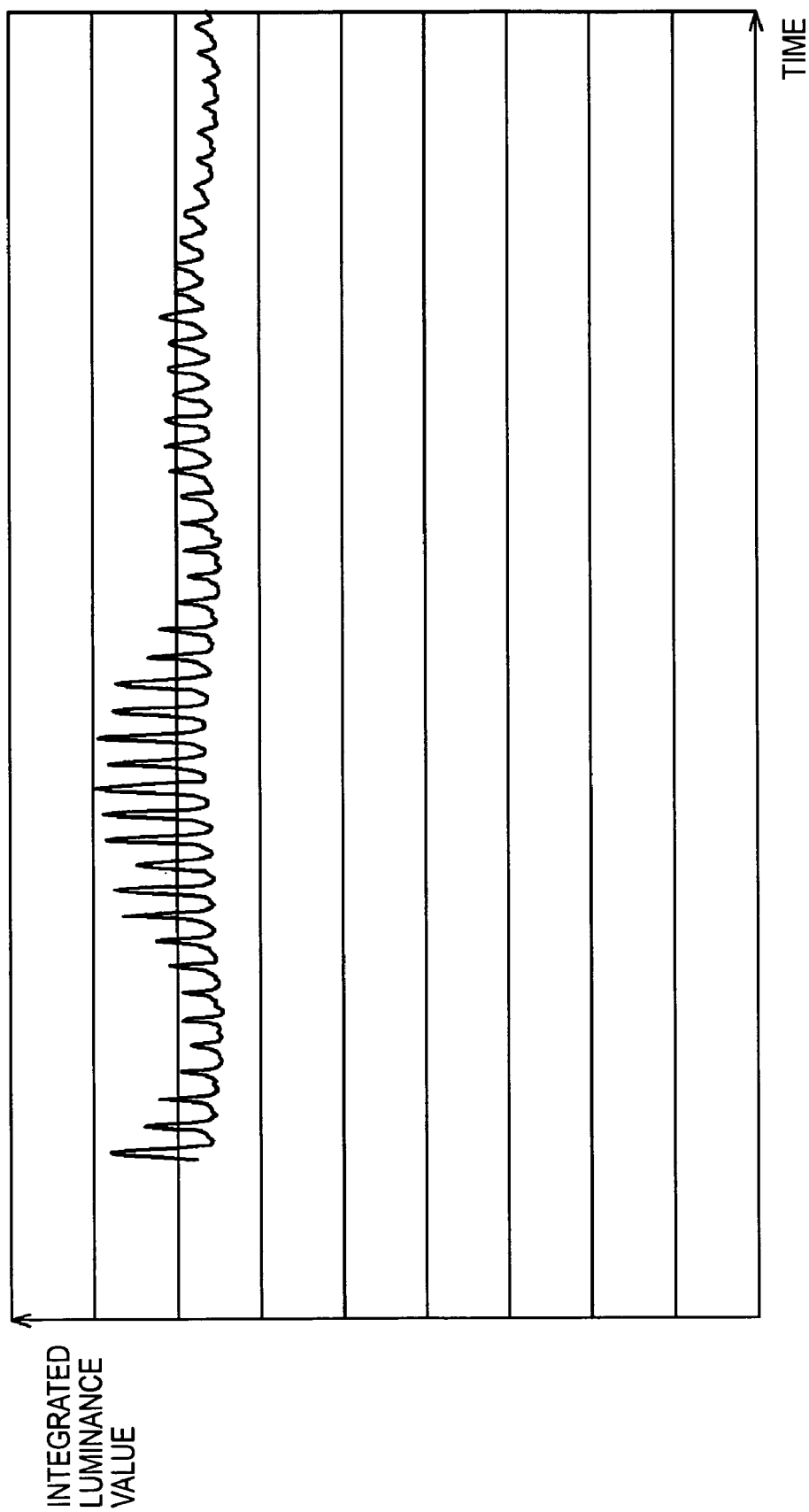
FIG. 1 is a plot of variations of an integrated luminance value obtained when a mirror ball is photographed.
Figure 2:
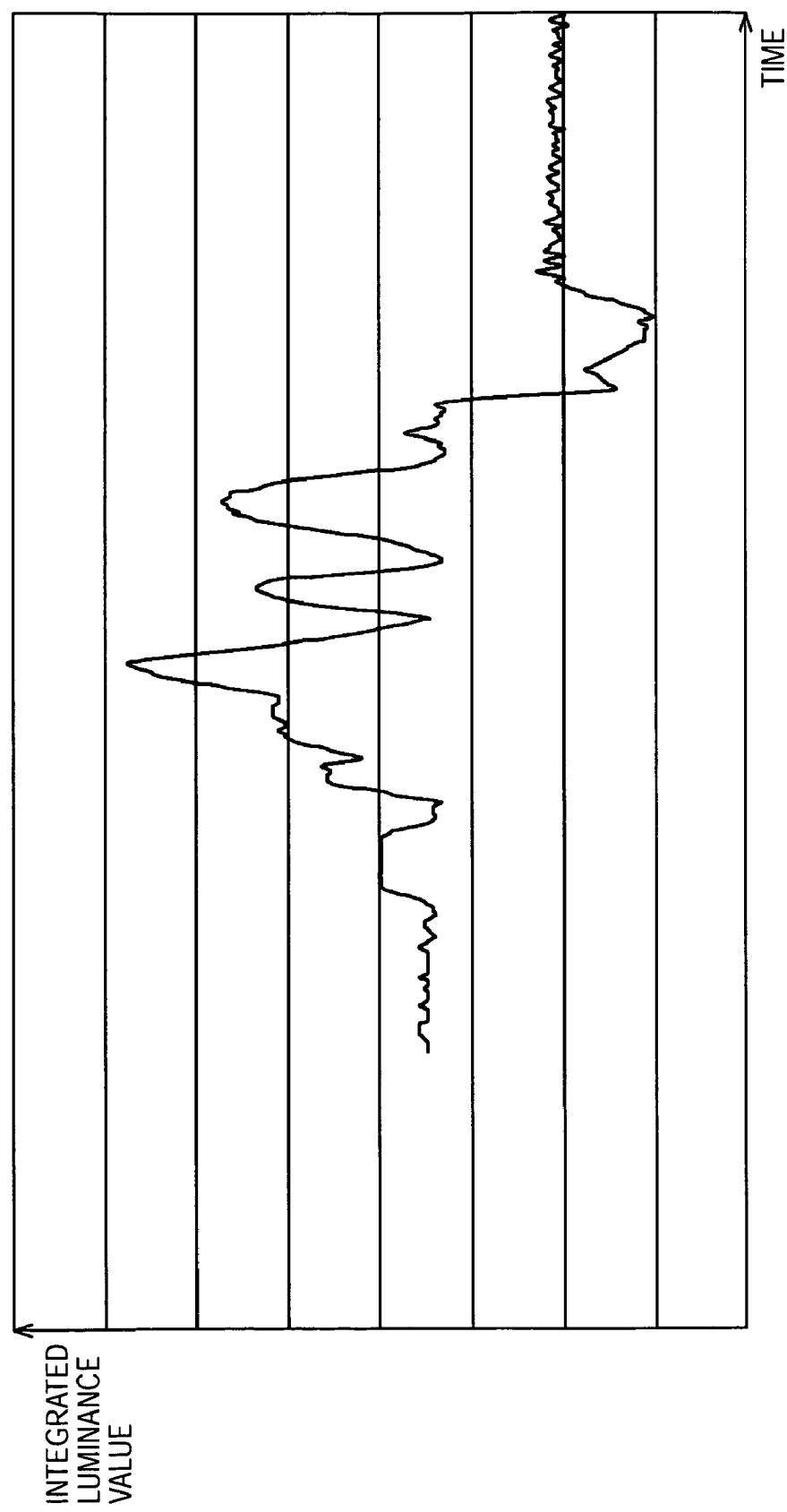
FIG. 2 is a plot of variations of the integrated luminance value obtained when a flower oscillating in a large displacement is photographed.

Before describing an embodiment of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A control apparatus (for example, an AF controller 53 of FIG. 3) of one embodiment of the present invention for controlling a driver (for example, an AF driver 51 of FIG. 3) driving an optical element (for example, one of a focusing lens and a wobbling lens of FIG. 3) of an image pickup device to adjust a focus position of the image pickup device (for example, an image pickup apparatus of FIG. 3) in the capturing of an image of a subject, includes a local peak comparing unit (for example, a local peak comparator 95 of FIG. 3) for comparing a local peak of an assessment value, as a parameter for adjusting the focus position, with a local peak of an integrated luminance value, the assessment value assessing an out-of-focus level of the captured image of the subject on a per field image basis, and the integrated luminance value being obtained by integrating a luminance value of the captured image of the subject on a per field image basis, and a mode selecting unit (for example, a mode selector 96 of FIG. 3) for selecting, from among a plurality of prepared modes, a mode searching for a peak over the entire range of the assessment value based on the comparison result provided by the local peak comparing unit.

The control apparatus further includes an assessment value calculating unit (for example, an assessment value calculator 81 of FIG. 3) for calculating the assessment value, and an integrated luminance value calculating unit (for example, an integrated luminance value calculator 82 of FIG. 3) for calculating the integrated luminance value. The local peak comparing unit compares the local peak of the assessment value calculated by the assessment value calculating unit with the local peak of the integrated luminance value calculated by the integrated luminance value calculating unit.

Figure 3:
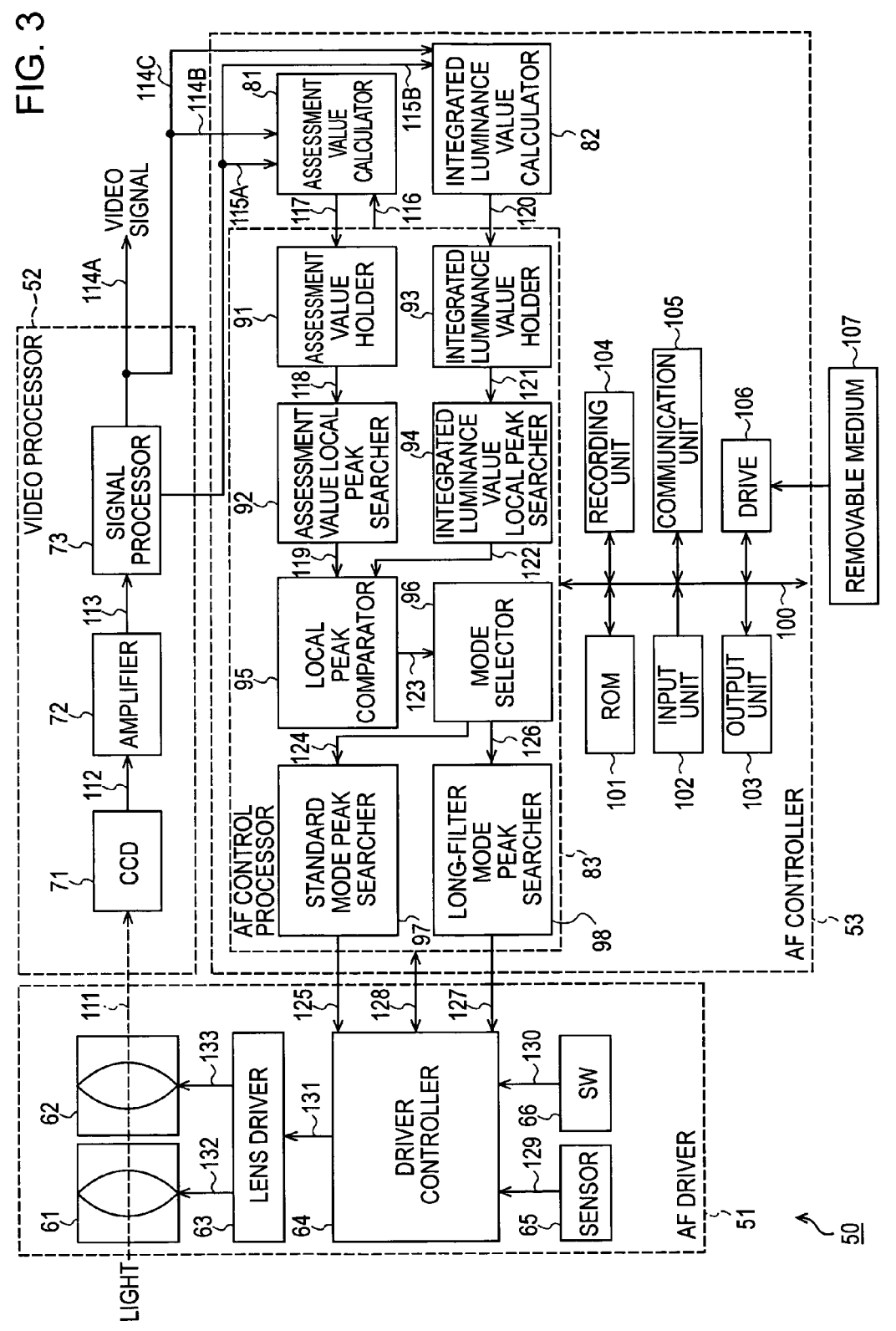

The control apparatus further includes an assessment value local peak detecting unit (for example, an assessment local peak searcher 92 of FIG. 3) for detecting the local peak of the assessment value calculated by the assessment value calculating unit, and an integrated luminance value local peak detecting unit (for example, an integrated luminance value local peak searcher 94 of FIG. 3) for detecting the local peak of the integrated luminance value calculated by the integrated luminance value calculating unit. The local peak comparing unit compares the local peak of the assessment value detected by the assessment value local peak detecting unit with the local peak of the integrated luminance value detected by the integrated luminance value local peak detecting unit.

The control apparatus further includes a peak search unit (for example, one of a standard mode peak searcher 97 and a long-filter mode peak searcher 98 of FIG. 3) for searching for a peak over the entire range of the assessment value in a mode selected by the mode selecting unit.

Another embodiment of the present invention relates to a method of a control apparatus (for example, an AF controller 53 of FIG. 3) for controlling a driver (for example, an AF driver 51 of FIG. 3) driving an optical element (for example, one of a focusing lens and a wobbling lens of FIG. 3) of an image pickup device to adjust a focus position of the image pickup device (for example, an image pickup apparatus of FIG. 3) in the capturing of an image of a subject. The control method includes steps of comparing a local peak of an assessment value, as a parameter for adjusting the focus position, with a local peak of an integrated luminance value, the assessment value assessing an out-of-focus level of the captured image of the subject on a per field image basis, and the integrated luminance value being obtained by integrating a luminance value of the captured image of the subject on a per field image basis (for example, in step S4 of FIG. 19), and selecting, from among a plurality of prepared modes, a mode searching for a peak over the entire range of the assessment value based on the comparison result provided in the local peak comparison step (for example, in step S5 of FIG. 19).

A computer program product of one embodiment of the present invention includes the same process steps as those of the control method of the embodiment of the present invention.

In another embodiment, the present invention relates to a camera (an image pickup apparatus of FIG. 3) of one embodiment of the present invention having an image pickup device (for example, a charge-coupled device (CCD) of FIG. 3) for capturing an image of a subject, and a driver (for example, the AF driver 51 of FIG. 3) for driving an optical element (for example, one of the focusing lens and the wobbling lens of FIG. 3) of the image pickup device to adjust a focus position of the image pickup device in the capturing of an image of a subject. The camera includes a local peak comparing unit (for example, the local peak comparator 95 of FIG. 3) for comparing a local peak of an assessment value, as a parameter for adjusting the focus position, with a local peak of an integrated luminance value, the assessment value assessing an out-of-focus level of the captured image of the subject on a per field image basis, and the integrated luminance value being obtained by integrating a luminance value of the captured image of the subject on a per field image basis, a mode selecting unit (for example, the mode selector 96 of FIG. 3) for selecting, from among a plurality of prepared modes, a mode searching for a peak over the entire range of the assessment value based on the comparison result provided by the local peak comparing unit, and a peak searching unit (for example, one of the standard mode peak searcher 97 and the long-filter mode peak searcher 98 of FIG. 3) for searching for the peak over the entire range of the assessment value by controlling the driver in the mode selected by the mode selecting unit.

The embodiments of the present invention are described below with reference to the drawings.

FIG. 3 illustrates an image pickup apparatus 50 in accordance with one embodiment of the present invention.

As shown in FIG. 3, the image pickup apparatus 50 captures an image of a subject, and acquires video data of one of a moving image and a still image of the subject. The image pickup apparatus 50 includes an auto-focus (AF) driver 51, a video processor 52, and an AF controller 53. The image pickup apparatus 50 also records the acquired video data on a recording medium and outputs the video data to the outside. FIG. 3 illustrates only elements in the image pickup apparatus 50 related to embodiments of the present invention.

The AF driver 51 includes a focus lens 61, a wobbling lens 62, a lens driver 63, a driver controller 64, a sensor 65, and a switch (SW) 66. Under the control of the AF controller 53, the AF driver 51 drives an optical system, thereby performing a focus position adjustment process on light picked up by the video processor 52.

The focus lens 61, moved along an optical axis direction of light incident on the video processor 52, controls a focus position of the incident light (focus position of a photographed image). The wobbling lens 62 is wobbled slightly along the optical axis direction of the light incident on the video processor 52 in order to move the focus position of the photographed image. The wobbling lens 62 is used to determine the direction of the movement of the focus lens 61 during a focal adjustment process (focus process). The focus lens 61 and the wobbling lens 62 may be integrated into a single lens unit (for example, the focus lens 61 may be operated to wobble as the wobbling lens 62).

In response to control information supplied from the driver controller 64, the lens driver 63 controls the focus position by controlling the focus lens 61 and the wobbling lens 62 in position and operation (i.e., operates the focus lens 61 and the wobbling lens 62 to control the focus position). As will be described later, the driver controller 64 is connected to an AF control processor 83 in the AF controller 53 via a serial bus. The driver controller 64 supplies the lens driver 63 with the control information regarding the driving of the focus lens 61 and the wobbling lens 62 in response to control information including a focus control command and a wobbling control command supplied from the AF control processor 83. The driver controller 64 supplies the control information to the lens driver 63, thereby commanding the lens driver 63 to move the focus lens 61 in position and cause the wobbling lens 62 to start the wobbling operation.

The driver controller 64 supplies information regarding an iris value and a focus position from the sensor 65 to the AF control processor 83 via the serial bus. The driver controller 64 is controlled in response to the status of a switch (SW) 66. Only when the SW 66 is in an on state, the driver controller 64 performs the control process and a communication process. When the SW 66 is in an off state, the driver controller 64 pauses, performing no process.

The sensor 65 senses the focus position, a zoom position (focal length), and an iris value, and supplies these pieces of measurement information to the AF control processor 83 via the driver controller 64. The SW 66 is operated by a user to determine whether to perform the AF process, and notifies the driver controller 64 of the state thereof.

The video processor 52 generates an electrical video signal in response to the light incident on the image pickup apparatus 50, and includes a charge-coupled device (CCD) 71, an amplifier 72 and a signal processor 73.

The CCD 71 is an image pickup device having photoelectrical conversion elements such as photodiodes. The CCD 71 photoelectrically converts the incident light entering through the focus lens 61 and the wobbling lens 62, accumulates a charge responsive to an mount of input light, and then drains the charge, thereby resulting in the electrical video signal. The CCD 71 supplies the video signal to the amplifier 72. Instead of the CCD 71, an image sensor of complementary metal oxide semiconductor (CMOS) may be used.

The amplifier 72 includes a correlated double sampling (CDS) circuit, an automatic gain control (AGC) circuit, and an analog-to-digital (A/D) converter circuit. The amplifier 72 removes reset noise in the video signal supplied from the CCD 71, amplifies the video signal, converts the video signal in analog form to a digital video signal, and then supplies the digital video signal to the signal processor 73.

The signal processor 73 performs an auto exposure (AE) process, an auto white balance (AWB) process and a γ correction process on the supplied video signal, and then supplies the resulting video signal to a subsequent circuit stage while supplying the resulting video signal to an assessment value calculator 81 and an integrated luminance value calculator 82, both in the AF controller 53 at the same time. The signal processor 73 also supplies the assessment value calculator 81 and the integrated luminance value calculator 82 with control synchronization signals including a horizontal synchronization signal and a vertical synchronization signal of the video signal, and a system clock signal.

In response to the video signal supplied from the video processor 52, the AF controller 53 controls the AF driver 51, thereby performing a control process relating to the control of the AF process. The AF controller 53 includes the assessment value calculator 81, the integrated luminance value calculator 82 and the AF control processor 83.

The assessment value calculator 81 calculates an assessment value, assessing an out-of-focus level of the captured image (video signal), on a per field image basis (on a per frame image basis in the case of a progressive system), based on the video signal and the synchronization signals supplied from the signal processor 73 in the video processor 52 and setting data supplied from the AF control processor 83. The assessment value calculator 81 supplies the calculated assessment value to an assessment value holder 91 in the AF control processor 83. The following discussion is based on the case in which the photographed image complies with an interlace system. However, the following discussion is equally applicable to the progressive system by simply substituting the frame unit for field unit.

The integrated luminance value calculator 82 calculates an integrated luminance value by integrating a luminance value of each pixel on a per field basis (on a per frame basis in the cases of the progressive system) on part or whole of the captured image (video signal) based on the video signal and the synchronization signals supplied from the signal processor 73 in the video processor 52. The integrated luminance value calculator 82 supplies the calculated integrated luminance value to an integrated luminance value holder 93 in the AF control processor 83.

As will be described in detail later, the AF control processor 83 searches for a local peak present in a localized area in the assessment value supplied from the assessment value calculator 81, rather than a peak in a general area, while also searching for a local peak in a localized area in the integrated luminance value supplied from the integrated luminance value calculator 82 rather than a peak in a general area. The AF control processor 83 compares the local peak of the searched assessment value with the local peak of the searched integrated luminance value, and selects a search mode for a peak over the general area based on the comparison result.

The AF control processor 83 includes the assessment value holder 91, an assessment local peak searcher 92, the integrated luminance value holder 93, an integrated luminance value local peak searcher 94, a local peak comparator 95, a mode selector 96, a standard mode peak searcher 97, and a long-filter mode peak searcher 98.

The assessment value holder 91 temporarily holds the assessment value per field supplied from the assessment value calculator 81, and then supplies the assessment value to the assessment local peak searcher 92 as necessary. The assessment local peak searcher 92 searches for a local peak of the assessment value supplied from the assessment value holder 91. More specifically, the assessment local peak searcher 92 searches for a short-term (local) peak (namely, a high-frequency peak) rather than a peak of the entire wavelength (a low-frequency peak). The assessment local peak searcher 92 searches for the local peak of the assessment value, and then supplies the search result to the local peak comparator 95.

The integrated luminance value holder 93 temporarily holds the integrated luminance value per field supplied from the integrated luminance value calculator 82, and then supplies the integrated luminance value to the integrated luminance value local peak searcher 94 as necessary. The integrated luminance value local peak searcher 94 searches for a local peak in the integrated luminance value supplied from the integrated luminance value holder 93. More specifically, the integrated luminance value local peak searcher 94 searches for a short-term (local) peak (namely, a high-frequency peak) rather than a peak of the entire wavelength (a low-frequency peak). The local peak comparator 95 thus searches for the local peak of the integrated luminance value and then supplies the search result to the local peak comparator 95.

The local peak comparator 95 receives, as assessment value local peak information, information relating to the positions and the number of the local peaks of the assessment value supplied from the assessment local peak searcher 92. The local peak comparator 95 also receives, as integrated luminance value local peak information, information relating to the positions and the numbers of the local peaks of the integrated luminance value supplied from the integrated luminance value local peak searcher 94. Based on the assessment value local peak information and the integrated luminance value local peak information, the local peak comparator 95 compares the local peaks in terms of peak position and peak count, and then supplies the comparison result to the mode selector 96.

The mode selector 96 selects between a standard mode and a long-filter mode as a mode for peak search (for the entire wavelength) based on the comparison result supplied from the local peak comparator 95. More specifically, based on the result of comparison between the assessment value local peak and the integrated luminance value local peak, the mode selector 96 determines whether the subject is a special one that instantaneously and intensively lights with a sharp luminance change involved on a periodical or non-periodical basis, such as a mirror ball or sunlight dappled through leaves of trees, i.e., determines whether the subject is to be handled in the long-filter mode. The mode selector 96 commands one of the standard mode peak searcher 97 and the long-filter mode peak searcher 98 to perform the peak search in the selected mode.

In response to the command from the mode selector 96, the standard mode peak searcher 97 supplies the control information to the driver controller 64 via the serial bus so that the focus lens 61 and the wobbling lens 62 perform the peak search in the standard mode such as a difference method or a check-down method.

In response to the command from the mode selector 96, the long-filter mode peak searcher 98 supplies the control information to the driver controller 64 via the serial bus so that the focus lens 61 and the wobbling lens 62 perform the peak search in the long-filter mode using moving average.

The AF controller 53 further includes a bus 100, a read-only memory (ROM) 101, an input unit 102, an output unit 103, a recording unit 104, a communication unit 105, and a drive 106. The AF control processor 83 is connected to the bus 100. Furthermore, the AF control processor 83 is connected to the ROM 101 through the drive 106 via the bus 100.

The ROM 101 is a read-only memory, and pre-stores a program to be executed by the AF control processor 83 and data. The program and data stored in the ROM 101 are read by the AF control processor 83 via the bus 100 as necessary. The input unit 102, including input devices such as switches and buttons, receives command information input by a user, and supplies the command information to the AF control processor 83 via the bus 100. The output unit 103 includes a display such as a light-emitting diode (LED), a liquid-crystal display (LCD), an electroluminescent display, or the like, and an audio output device such as a loudspeaker. The output unit 103 displays and outputs information supplied from the AF control processor 83 via the bus 100.

The recording unit 104, including a hard disk, a semiconductor memory, or the like, stores a program to be executed by the AF control processor 83 and data. The communication unit 105 includes a modem, a local-area network (LAN) adaptor, a universal serial bus (USB) interface, an institute of electrical and electronic engineers (IEEE) 1394 interface, a small computer system interface (SCSI), IEEE 802.11x adaptor, or the like. The communication unit 105 communicates with another apparatus via a network. For example, the communication unit 105 receives information from the other apparatus and supplies the received information to the AF control processor 83 and transmits information from the AF control processor 83 to the other apparatus.

The drive 106 is a read and write processing unit loaded with a removable medium 107, and reads data from and writes data onto the removable medium 107. The removable medium 107 includes a magnetic disk, an optical disk, a magneto-optical disk, a semiconductor memory, or the like. The drive 106 reads programs and data from the loaded removable medium 107, install the read program onto the recording unit 104 and supplies the read program to the AF control processor 83 as necessary. The drive 106 stores programs and data, retrieved from the AF control processor 83 via the bus 100, onto the loaded removable medium 107.

When the process of the AF control processor 83 is performed using software, a program forming the software is installed from a recording medium or via network.

The recording medium storing the program may be the removable medium 107 supplied to the user separately from the body of the apparatus to supply the user with the program. The removable medium 107 may include one of a magnetic disk (including a floppy disk), an optical disk (such as compact-disk read-only memory (CD-ROM), a digital versatile disk (DVD), or the like), a magneto-optical disk (such as Mini-Disk (MO®)), and a semiconductor memory. The recording medium also includes one of the ROM 101 and the recording unit 104 (including one of a hard disk and a semiconductor memory), each of which is supplied in the apparatus body to the user.

The operation of the apparatus is described below.

When a photographing operation is started, the CCD 71 in the video processor 52 photoelectrically converts light entering through the focus lens 61 and the wobbling lens 62 in the AF driver 51 along the optical axis represented by an arrow-headed broken line 111, thereby resulting in video information (video signal) in an electrical form. The CCD 71 supplies the video signal to the amplifier 72 as represented by an arrow-headed solid line 112. After amplifying the video signal in accordance with a predetermined method, the amplifier 72 supplies a resulting amplified video signal to the signal processor 73 as represented by an arrow-headed solid line 113. The signal processor 73 performs a video process on the supplied video signal and then supplies the processed video signal to a subsequent stage as represented by an arrow-headed solid line 114A while supplying the processed video signal to the assessment value calculator 81 and the integrated luminance value calculator 82 in the AF controller 53 as respectively represented by an arrow-headed solid line 114B and an arrow-headed solid line 114C. As represented by arrow-headed solid lines 115A and 115B, the signal processor 73 further supplies the synchronization signal to the assessment value calculator 81 and the integrated luminance value calculator 82, respectively.

The assessment value calculator 81 calculates, in accordance with a predetermined calculation method, an assessment value assessing the out-of-focus level of a captured image corresponding to the video signal supplied from the signal processor 73, based on setting data supplied from the AF control processor 83, as represented by an arrow-headed solid line 116. The assessment value indicates the magnitude of contrast in a portion of the image area (assessment frame) in a frame image, and is calculated based on the sum of high-frequency components of the luminance value in the assessment frame. Upon having calculated the assessment value on a per field basis, the assessment value calculator 81 supplies the assessment value to the assessment value holder 91 in the AF control processor 83 as represented by an arrow-headed solid line 117.

As represented by the arrow-headed solid line 117, the assessment value holder 91 receives and temporarily stores the assessment value supplied on a per field basis. As represented by an arrow-headed solid line 118, the assessment value holder 91 supplies the assessment value to the assessment local peak searcher 92 as necessary. The assessment local peak searcher 92 receives the assessment value as represented by the arrow-headed solid line 118, and then searches for a local peak in the assessment value. The assessment local peak searcher 92 supplies to the local peak comparator 95, as the search result, assessment value local peak information relating to the number of and the positions of the detected local peaks of the assessment value.

The integrated luminance value calculator 82 calculates an integrated luminance value by integrating the luminance value of the video signal, supplied from the signal processor 73, on a per field basis for all or part of the pixels forming the field image in accordance with a predetermined calculation method. Upon calculating the integrated luminance value on a per field basis, the integrated luminance value calculator 82 supplies the calculated integrated luminance value to the integrated luminance value holder 93 in the AF control processor 83 as represented by an arrow-headed solid line 120.

The integrated luminance value holder 93 temporarily stores the integrated luminance value that has been supplied by the integrated luminance value calculator 82 on a per field basis as represented by an arrow-headed solid line 120. The integrated luminance value holder 93 supplies the integrated luminance value to the integrated luminance value local peak searcher 94, as necessary, as represented by an arrow-headed solid line 121. The integrated luminance value local peak searcher 94 searches for a local peak of the integrated luminance value that has been supplied as represented by the arrow-headed solid line 121. The integrated luminance value local peak searcher 94 supplies to the local peak comparator 95 as represented by an arrow-headed solid line 122, as the search result, integrated luminance value local peak information relating to the number of and the positions of the local peaks in the integrated luminance value.

The local peak comparator 95 compares the positions and the number of local peaks in the supplied assessment value and the positions and the number of local peaks in the supplied integrated luminance value, and supplies the comparison result to the mode selector 96 as represented by an arrow-headed solid line 123. In response to the comparison result, the mode selector 96 selects between performing the standard mode peak search and performing the long-filter mode peak search, and then commands one of the selected peak searchers (one of the standard mode peak searcher 97 and the long-filter mode peak searcher 98) to perform the peak search process. When the mode selector 96 selects the mode, the corresponding one of the standard mode peak searcher 97 and the long-filter mode peak searcher 98 performs the selected peak search process.

When the standard mode peak search is to be executed, the mode selector 96 commands the standard mode peak searcher 97 to perform the peak search process as represented by an arrow-headed solid line 124. In response to the command, the standard mode peak searcher 97 controls the driver controller 64 via the serial bus as represented by an arrow-headed solid line 125. When the long-filter mode peak search is to be executed, the mode selector 96 commands the long-filter mode peak searcher 98 to perform the peak search process as represented by an arrow-headed solid line 126. In response to the command, the long-filter mode peak searcher 98 controls the driver controller 64 via the serial bus as represented by an arrow-headed solid line 127.

In response to control of one of the standard mode peak searcher 97 and the long-filter mode peak searcher 98 in the AF control processor 83 (as represented by the arrow-headed solid lines 125 and 127), the driver controller 64 controls the lens driver 63 as represented by an arrow-headed solid line 131, thereby driving the focus lens 61 and the wobbling lens 62 (as respectively represented by arrow-headed solid lines 132 and 133). However, the driver controller 64 performs this driving process only when it is notified as represented by an arrow-headed solid line 130 that the SW 66 is at an on state. When the SW 66 is at an off state, the driver controller 64 pauses, thereby remaining uncontrolled by the AF control processor 83 (including the standard mode peak searcher 97 and the long-filter mode peak searcher 98).

Upon receiving sensor information regarding the focus position, the zoom position (focal distance), and the iris value from the sensor 65 as represented by an arrow-headed solid line 129, the driver controller 64 supplies the sensor information to the AF control processor 83 as represented by an arrow-headed solid line 128. The AF control processor 83 generates setting data for assessment value calculation from the sensor information, and then supplies the resulting setting data to the assessment value calculator 81 as represented by an arrow-headed solid line 116.

The image pickup apparatus 50 controls the AF process in this way.

Figure 4:
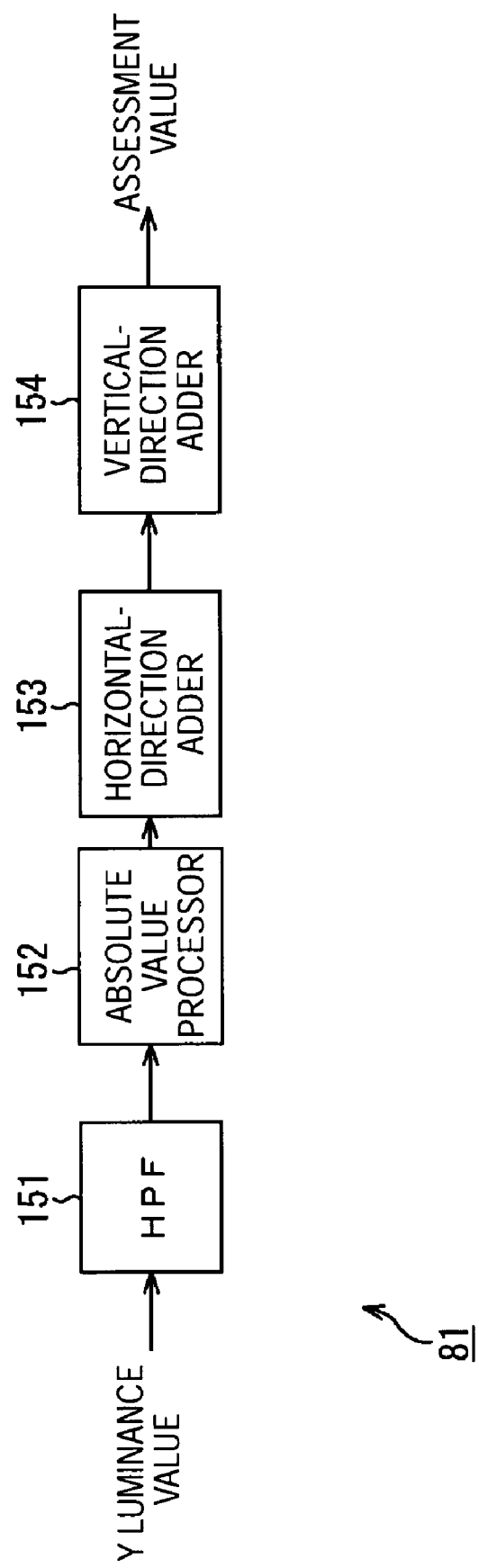
FIG. 4 is a block diagram of an assessment value calculator of FIG. 3.

FIG. 4 illustrates the structure of the assessment value calculator 81 of FIG. 3 in detail.

As shown in FIG. 4, the assessment value calculator 81 includes a high-pass filter (HPF) 151 for extracting a high-frequency component from the luminance value, an absolute value processor 152 for absolutizing the luminance value, a horizontal-direction adder 153 for summing absolute luminance values of pixels in a horizontal direction, and a vertical-direction adder 154 for summing the horizontally summed luminance values in a vertical direction.

Upon receiving the video signal from the signal processor 73, the HPF 151 in the assessment value calculator 81 extracts a high-frequency component from the luminance value of the video signal. In the assessment value calculator 81, then, the absolute value processor 152 absolutizes the extracted high-frequency component, the horizontal-direction adder 153 sums the absolute values of the luminance value in the horizontal direction, and the vertical-direction adder 154 sums the horizontally summed luminance values in the vertical direction. In this way, the assessment values for the field image are calculated.

Figure 5:
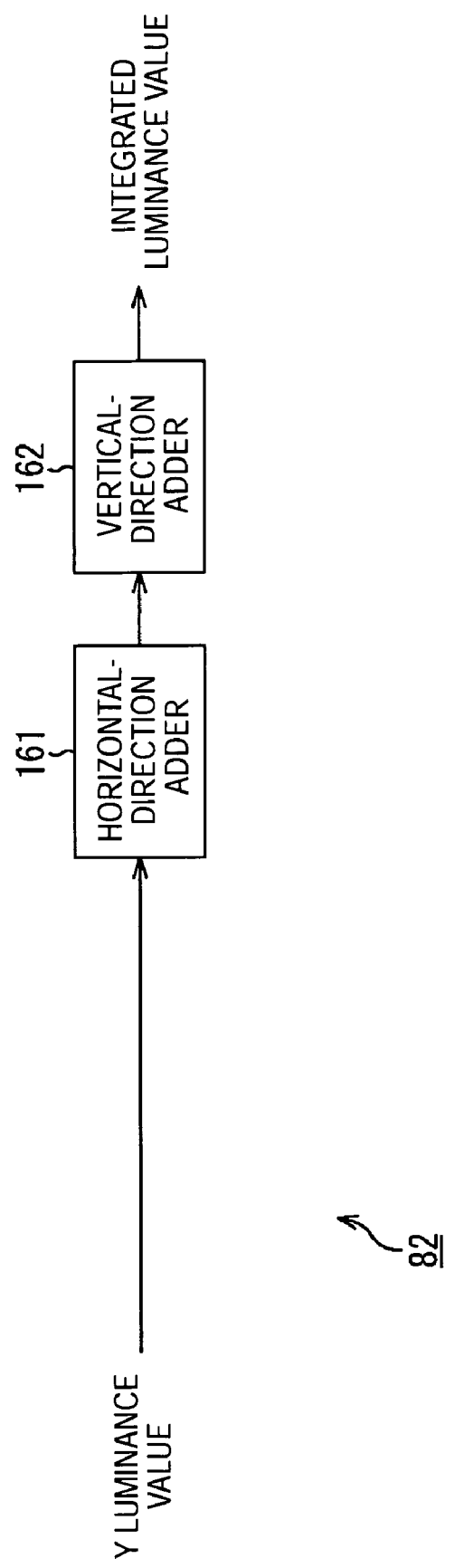
FIG. 5 is a block diagram illustrating in detail an integrated luminance value calculator of FIG. 3.

FIG. 5 is a block diagram illustrating the integrated luminance value calculator 82 of FIG. 3 in detail.

As shown in FIG. 5, the integrated luminance value calculator 82 includes a horizontal-direction adder 161 for summing luminance values of pixels in a horizontal direction, and a vertical-direction adder 162 for summing the horizontally summed luminance values in a vertical direction.

More specifically, upon receiving the video signal from the signal processor 73, the horizontal-direction adder 153 in the integrated luminance value calculator 82 sums the luminance values of the video signal in a horizontal direction, and the vertical-direction adder 154 in the integrated luminance value calculator 82 sums the horizontally summed luminance value in the vertical direction. The integrated luminance value of the field image is thus calculated.

Figure 6:
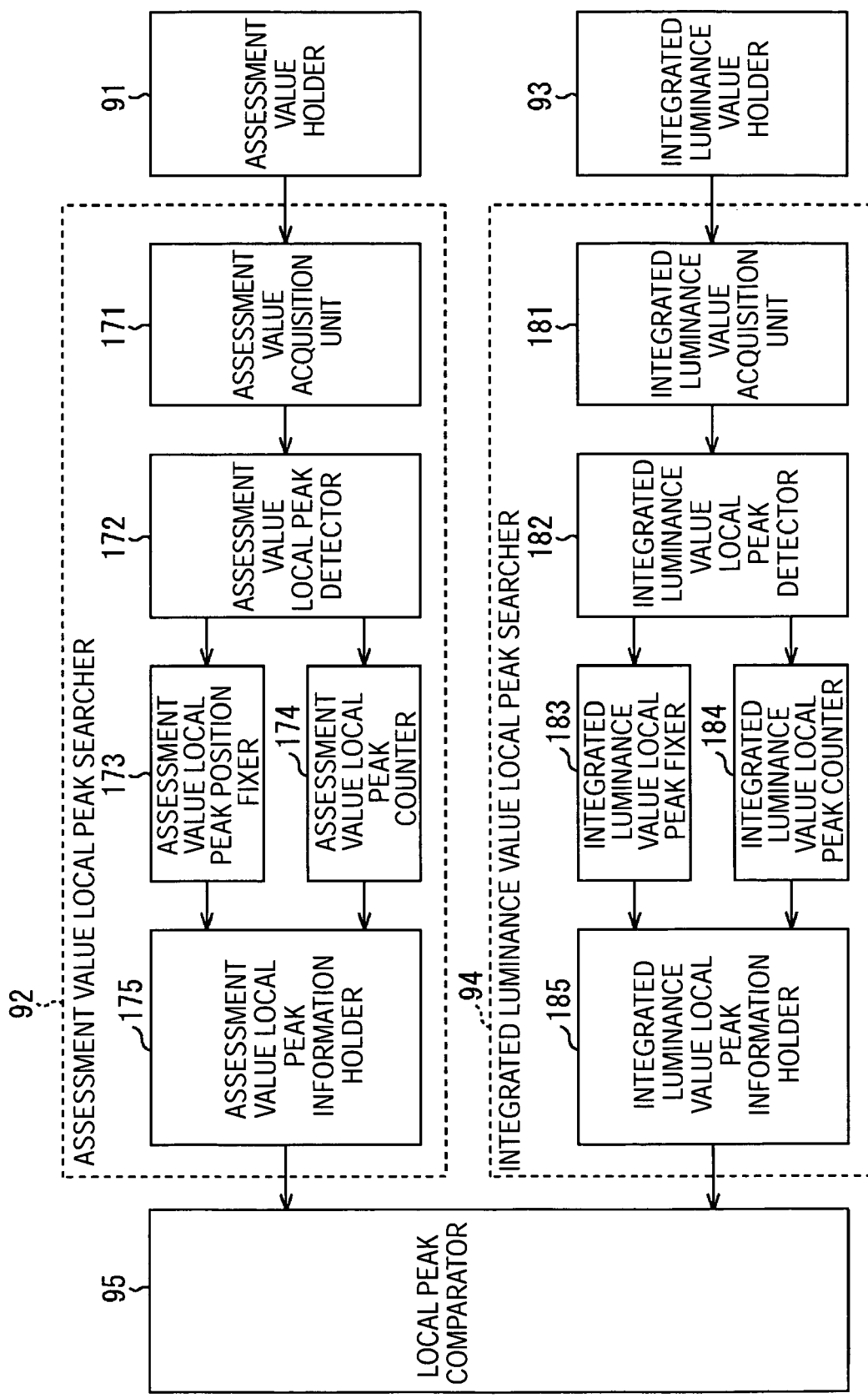
FIG. 6 is a block diagram illustrating in detail an assessment value local peak searcher of FIG. 3.

FIG. 6 is a block diagram illustrating in detail the assessment local peak searcher 92 and the integrated luminance value local peak searcher 94, each shown in FIG. 3.

The assessment local peak searcher 92 includes an assessment value acquisition unit 171, an assessment value local peak detector 172, an assessment value local peak position fixer 173, an assessment value local peak counter 174, and an assessment value local peak information holder 175.

The assessment value acquisition unit 171 retrieves the assessment value from the assessment value holder 91, and then supplies the assessment value to the assessment value local peak detector 172. The assessment value local peak detector 172 tracks the variations in the supplied assessment value to detect a local peak in the assessment value (assessment value local peak), and then supplies the detected assessment value local peak to the assessment value local peak position fixer 173 and the assessment value local peak counter 174. The assessment value local peak position fixer 173 fixes the position (field) of the assessment value local peak detected by the assessment value local peak detector 172, and supplies the position information of the assessment value local peak to the assessment value local peak information holder 175 for storage. The assessment value local peak counter 174 counts the number of assessment value local peaks detected by the assessment value local peak detector 172, and supplies the count of the assessment value local peaks to the assessment value local peak information holder 175 for storage.

The assessment value local peak information holder 175 holds, as assessment value local peak information, the position information regarding the assessment value local peaks supplied from the assessment value local peak position fixer 173 and the information regarding the counts of the assessment value local peaks supplied from the assessment value local peak counter 174. The assessment value local peak information holder 175 then outputs the assessment value local peak information to the local peak comparator 95 at a predetermined timing.

The integrated luminance value local peak searcher 94 includes an integrated luminance value acquisition unit 181, an integrated luminance value local peak detector 182, an integrated luminance value local peak fixer 183, an integrated luminance value local peak counter 184, and an integrated luminance value local peak information holder 185.

The integrated luminance value acquisition unit 181 retrieves the integrated luminance value from the integrated luminance value holder 93, and supplies the retrieved integrated luminance value to the integrated luminance value local peak detector 182. The integrated luminance value local peak detector 182 tracks the variations of the supplied integrated luminance value to detect a local peak of the integrated luminance value (integrated luminance value local peak). The integrated luminance value local peak detector 182 supplies information regarding the detected integrated luminance value local peak to the integrated luminance value local peak fixer 183 and the integrated luminance value local peak counter 184. The integrated luminance value local peak fixer 183 fixes the position (field) of the integrated luminance value local peak detected by the integrated luminance value local peak detector 182, and supplies the integrated luminance value local peak information to the integrated luminance value local peak information holder 185 for storage. The integrated luminance value local peak counter 184 counts the number of integrated luminance value local peaks detected by the integrated luminance value local peak detector 182, and then supplies the integrated luminance value local peak count to the integrated luminance value local peak information holder 185 for storage.

The integrated luminance value local peak information holder 185 stores, as integrated luminance value local peak information, the position information regarding the integrated luminance value local peaks supplied from the integrated luminance value local peak fixer 183 and the count information regarding the count of integrated luminance value local peaks supplied from the integrated luminance value local peak counter 184. The integrated luminance value local peak information holder 185 supplies the integrated luminance value local peak information to the local peak comparator 95 at a predetermined timing.

Figure 7:
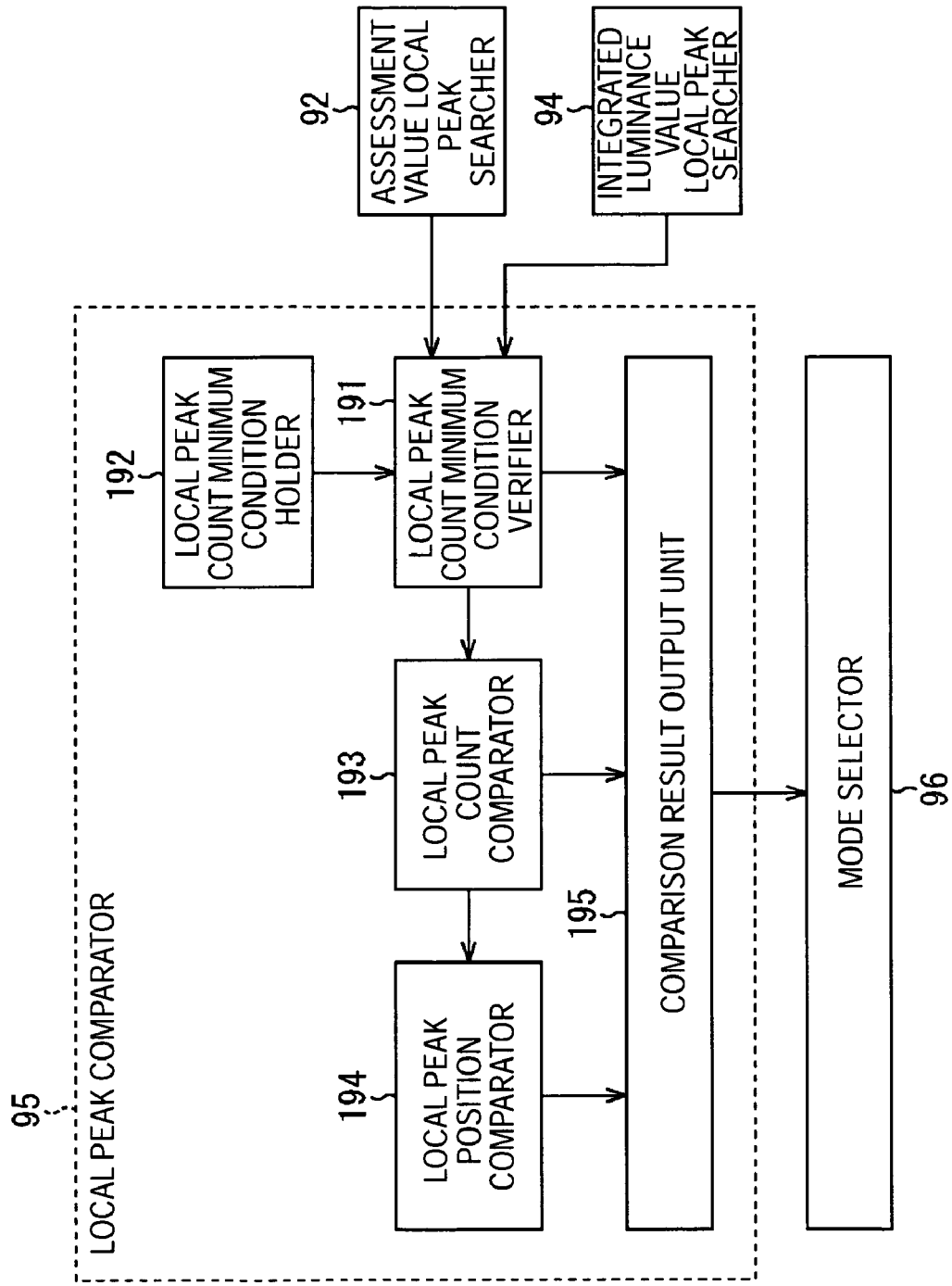
FIG. 7 is a block diagram illustrating in detail a local peak comparator of FIG. 3.

FIG. 7 is a block diagram illustrating in detail the local peak comparator 95 of FIG. 3.

As shown in FIG. 7, the local peak comparator 95 compares the assessment value local peak and the integrated luminance value local peak in terms of peak position and peak count. The local peak comparator 95 includes a local peak count minimum condition verifier 191, a local peak count minimum condition holder 192, a local peak count comparator 193, a local peak position comparator 194, and a comparison result output unit 195.

The local peak count minimum condition verifier 191 receives the assessment value local peak information from the assessment local peak searcher 92 and the integrated luminance value local peak information from the integrated luminance value local peak searcher 94. The local peak count minimum condition verifier 191 then retrieves a local peak count minimum condition stored in the local peak count minimum condition holder 192 (a minimum count that is required to determine that the detected local peaks are effective), and compares the minimum condition with the assessment value local peak count contained in the assessment value local peak information or the integrated luminance value local peak count contained in the integrated luminance value local peak information. The local peak count minimum condition verifier 191 thus determines whether the local peak count satisfies the minimum condition (i.e., confirms that the local peak count is not too small). Upon determining that both the assessment value local peak count and the integrated luminance value local peak count satisfy the minimum condition, the local peak count minimum condition verifier 191 supplies to the local peak count comparator 193 local peak information (including the assessment value local peak information and the integrated luminance value local peak information). If one of the assessment value local peak information and the integrated luminance value local peak information fails to satisfy the minimum condition, the comparison result is supplied to the comparison result output unit 195.

In response to the local peak information, the local peak count comparator 193 compares the assessment value local peak count with the integrated luminance value local peak count. If the two counts match, the local peak count comparator 193 supplies the local peak information to the local peak position comparator 194. If the two counts fail to match, the local peak count comparator 193 supplies the comparison result to the comparison result output unit 195.

In response to the supplied local peak information, the local peak position comparator 194 compares the position of the assessment value local peak with the position of the integrated luminance value local peak, and outputs the comparison result to the comparison result output unit 195.

The comparison result output unit 195 receives the verification result supplied from the local peak count minimum condition verifier 191, the comparison result supplied from the local peak count comparator 193, and the comparison result supplied from the local peak position comparator 194, and then outputs the received results as the comparison results of the local peaks to the mode selector 96. In response to the comparison results, the mode selector 96 selects between the standard mode and the long-filter mode as the peak search mode.

Figure 8:
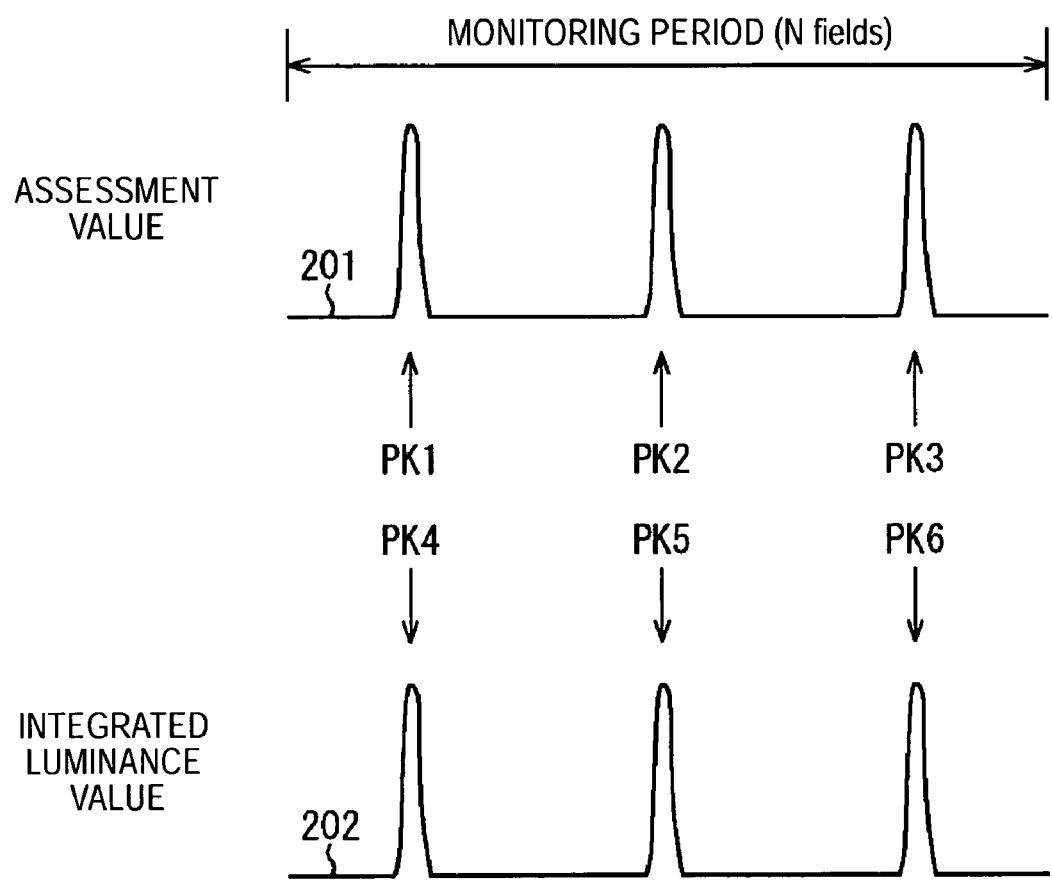
FIG. 8 illustrates a waveform diagram in which peaks are synchronized.

As shown in FIG. 8, the local peak comparator 95 determines whether the local peaks of the assessment value matches the local peaks of the integrated luminance value in terms of peak position and peak count during a monitoring period. If the peaks from the two values match, the mode selector 96 selects the long-filter mode. If not, the mode selector 96 selects the standard mode.

As shown in FIG. 8, a waveform 201 shows variations in the assessment value during a monitoring period (N fields corresponding to the assessment value acquired by the assessment value acquisition unit 171 (N is a natural number)). PK1 through PK3 respectively represent timings of local peaks of the assessment value. A waveform 202 represents variations in the integrated luminance value during the monitoring period (the fields corresponding to the integrated luminance value acquired by the integrated luminance value acquisition unit 181). PK4 through PK6 respectively represent timings of local peaks of the integrated luminance value. If the assessment value matches the integrated luminance value in terms of peak position and peak number, PK1, PK2, and PK3 match PK4, PK5, and PK6 in timing (field). In such a case, the mode selector 96 determines that the subject is a special one such as a mirror ball or sunlight dappled through leaves of trees, and selects the long-filter mode as the peak search mode.

The principle of the selection method is described below with reference to FIGS. 9A and 9B through FIG. 13A and 13B.

Figure 9A:
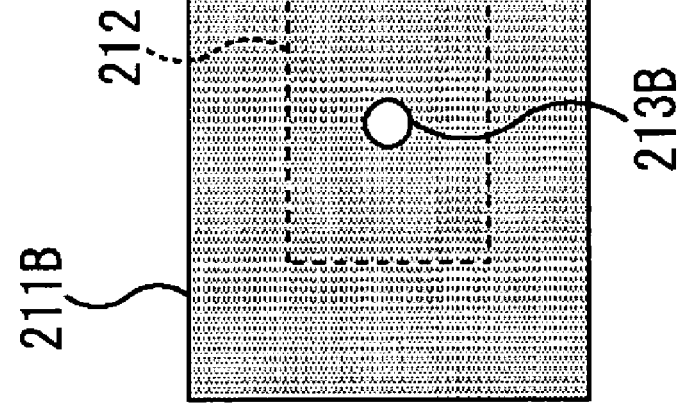
FIGS. 9A and 9B illustrate the flashing of a point light source contained in a photographed image.
Figure 9B:
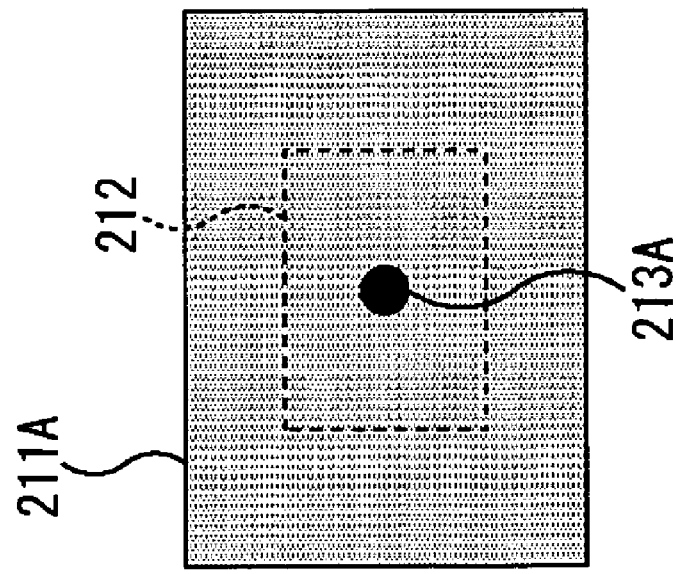

FIGS. 9A and 9B illustrate a photographed image of a flashing point light source. As shown, a photographed image 211A shown in FIG. 9A includes an image of an extinguished point light source 213A photographed within an assessment frame 212. In contrast to the photographed image 211A, a photographed image 211B shown as a blank circle in FIG. 9B includes an image of a lighting point light source 213B photographed within the assessment frame 212. The backgrounds of the photographed image 211A and the photographed image 211B are gray, and the luminance value thereof is closer to black rather than white.

Figure 10A:
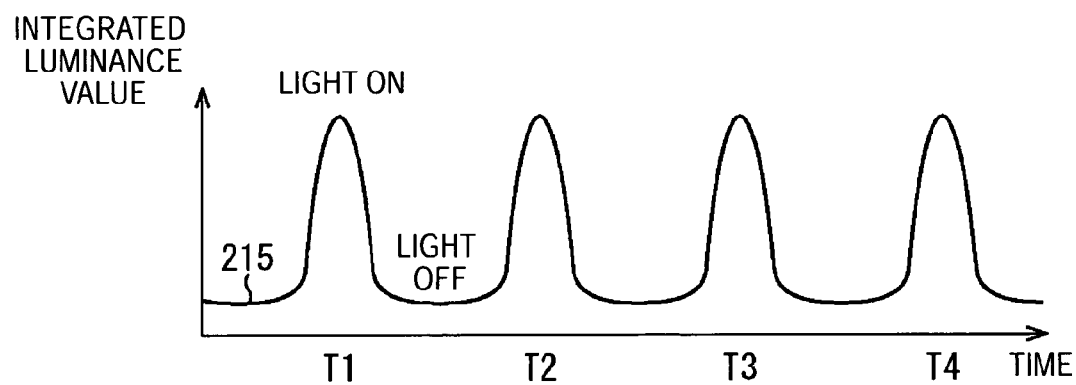
FIGS. 10A and 10B illustrate plots of peak positions of the integrated luminance value and the assessment value for comparison.
Figure 10B:
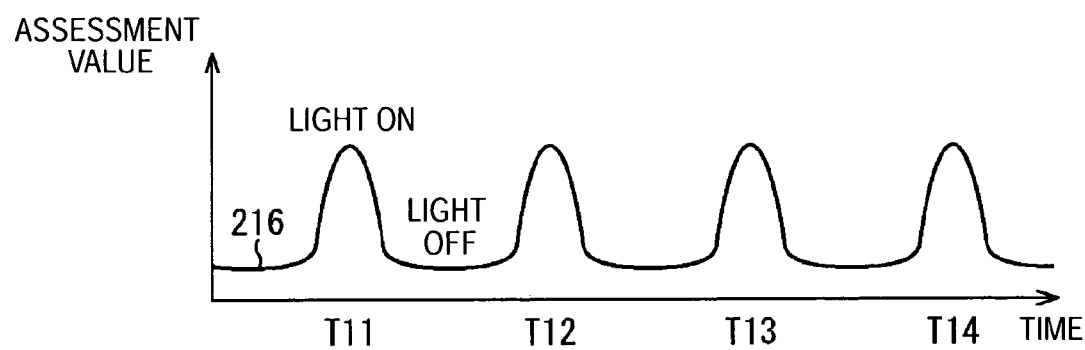

If the point light source flashes with a predetermined period, the photographed image is switched between the photographed image 211A and the photographed image 211B. If the point light source is transitioned from an off state as in the point light source 213A represented by the photographed image 211A to an on state as in the point light source 213B represented by the photographed image 211B, the integrated luminance value becomes larger by the quantity corresponding to the point light source. Simultaneously, the contrast is transitioned from almost no contrast state (photographed image 211A) to a clear contrast state (photographed image 211B). The assessment value is increased accordingly. As shown in FIGS. 10A and 10B, the local peak of the assessment value and the local peak of the integrated luminance value matches in generation timing. Peak timings T1 through T4 appearing in a waveform 215 of the plot of the integrated luminance value shown in FIG. 10A respectively match peak timings T11 through T14 appearing in a waveform 216 of the plot of the assessment value shown in FIG. 10B.

For example, the mirror ball is considered as having an area rather than a point. Alternatively, the mirror ball can be considered as a set of point light sources (group of point light sources). If all point light sources are turned on, the integrated luminance value increases, thereby leading to a rise in assessment value (with no contrast occurring between adjacent point light sources of the group of point light sources). The entire group of point light sources increases in both the integrated luminance value and the assessment value. In the case of light from the mirror ball (light source), the generation timing of the local peak of the integrated luminance value matches (is synchronized with) the generation timing of the local peak of the assessment value. The same is true of light (light source) at any location of the mirror ball. If the subject is a special subject that instantaneously and intensively lights with a sharp luminance change involved on a periodical or non-periodical basis, such as a mirror ball and sunlight dappled through leaves of trees, the generation timings of the local peaks of the assessment value and the integrated luminance value matches with each other (are synchronized with each other).

Ordinary subjects do not contain any point light source that is turned on and off repeatedly (in other words, do not contain point light sources, the number of which is not so many as to affect the integrated luminance value and the assessment value). The elements of an image contained in the ordinary subject are described below.

Figure 11B:
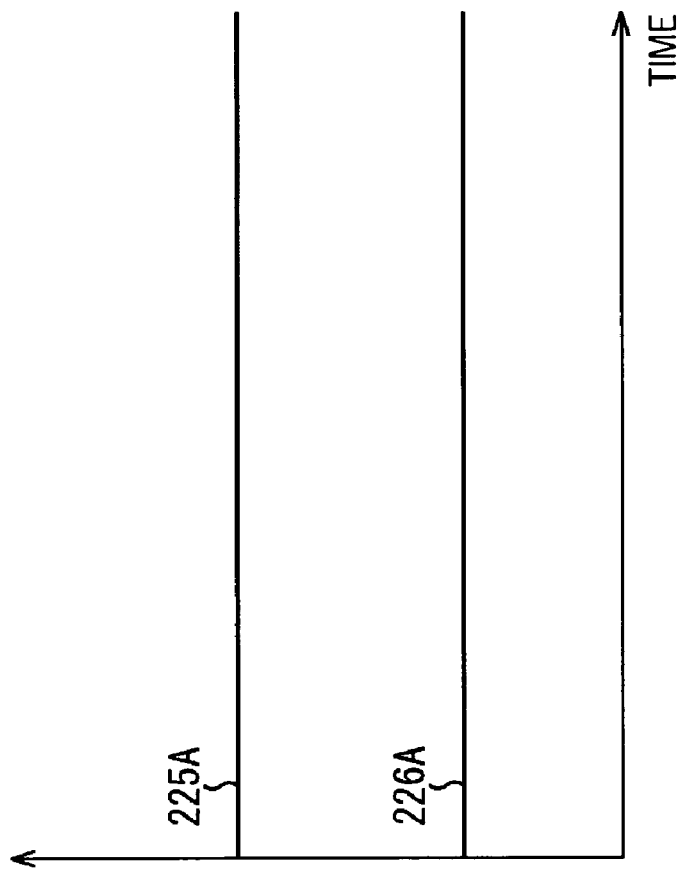
FIGS. 11A and 11B illustrate variations of a dark subject in an assessment frame.
Figure 11A:
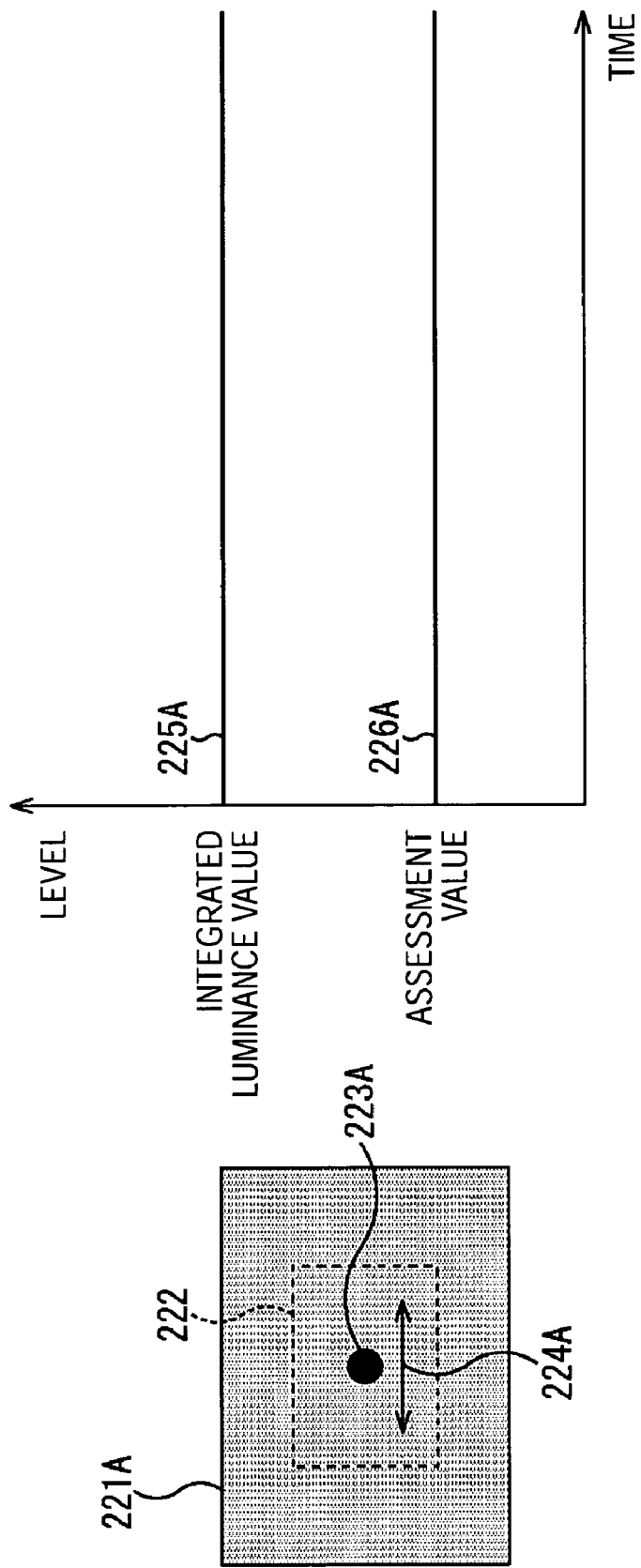

FIGS. 11A and 11B illustrate a subject oscillating within an assessment frame and darker than the background in the photographed image. As shown in FIG. 11A, a photographed image 221A is such a subject. A dark subject 223A oscillating as represented by a double-arrow-headed line 224A is present within an assessment frame 222 of the photographed image 221A. As shown in the plot of FIG. 11B, the assessment value and the integrated luminance value of the photographed image 221A remain unchanged. As shown in FIG. 11B, a solid line 225A represents how the integrated luminance value varies, and a solid line 226A represents how the assessment value varies. Even if the dark subject 223A oscillates within the assessment frame 222, the assessment value and the integrated luminance value remain unchanged.

As shown in FIGS. 12A and 12B, the dark subject 223A oscillates, thereby repeatedly entering and leaving the assessment frame 222. The dark subject 223A repeatedly enters and then leaves the assessment frame 222 in the photographed image 221B as represented by a double-headed-line 224B in FIG. 12A. Both the assessment value and the integrated luminance value are calculated within the assessment frame 222, and vary as plotted in FIG. 12B. As shown in FIG. 12B, a waveform 225B represents a variation in the integrated luminance value while a waveform 226B represents a variation in the assessment value. More specifically, when the subject 223A darker than the background enters the assessment frame 222, a contrast takes place between the dark subject 223A and the area surrounding the dark subject 223A, and the assessment value rises. The integrated luminance value falls because the dark subject 223A is darker than the background. Conversely, when the dark subject 223A leaves the assessment frame 222, the assessment value falls because of no contrast in the assessment frame 222. The integrated luminance value rises because a dark portion within the assessment frame 222 (dark subject 223A) is reduced in area. The assessment value and the integrated luminance value vary at the same timing but in opposite directions. More specifically, the assessment value and the integrated luminance value are not synchronized (in other words, the assessment value and the integrated luminance value fail to increase or decrease at the same timing).

FIGS. 13A and 13B illustrate a subject 223B brighter than the background and repeatedly entering and then leaving the assessment frame 222 in an oscillating motion. As shown in FIG. 13A, the bright subject 223B oscillates, thereby repeatedly entering and then leaving the assessment frame 222 in the photographed image 221C as represented by a double-headed-line 224B in FIG. 13A (in the same way as in FIGS. 12A and 12B). When the assessment value and the integrated luminance value are calculated within the assessment frame 222, the assessment value and the integrated luminance value vary as shown in FIG. 13B. As shown in FIG. 13B, a waveform 225C represents how the integrated luminance value varies while a waveform 226C represents how the assessment value varies. More specifically, when the subject 223B brighter than the background enters the assessment frame 222, a contrast takes place between the bright subject 223B and an area surrounding the bright subject 223B, causing the assessment value to rise. The integrated luminance value also rises because the bright subject 223B is brighter than the background. When the bright subject 223B leaves the assessment frame 222, no contrast is caused in the assessment frame 222, leading to a fall in the assessment value. The integrated luminance value also falls because a bright area within the assessment frame 222 (bright subject 223B) is reduced in size. The assessment value and the integrated luminance value rise and fall at the same timing, in other words, are synchronized with each other.

Since the ordinary subject (other the special subject) is composed of a variety of points (including white points, gray points, and dark points), it is unlikely that the assessment value and the integrated luminance value are synchronized in a manner distinct enough to be detected.

Figure 15:
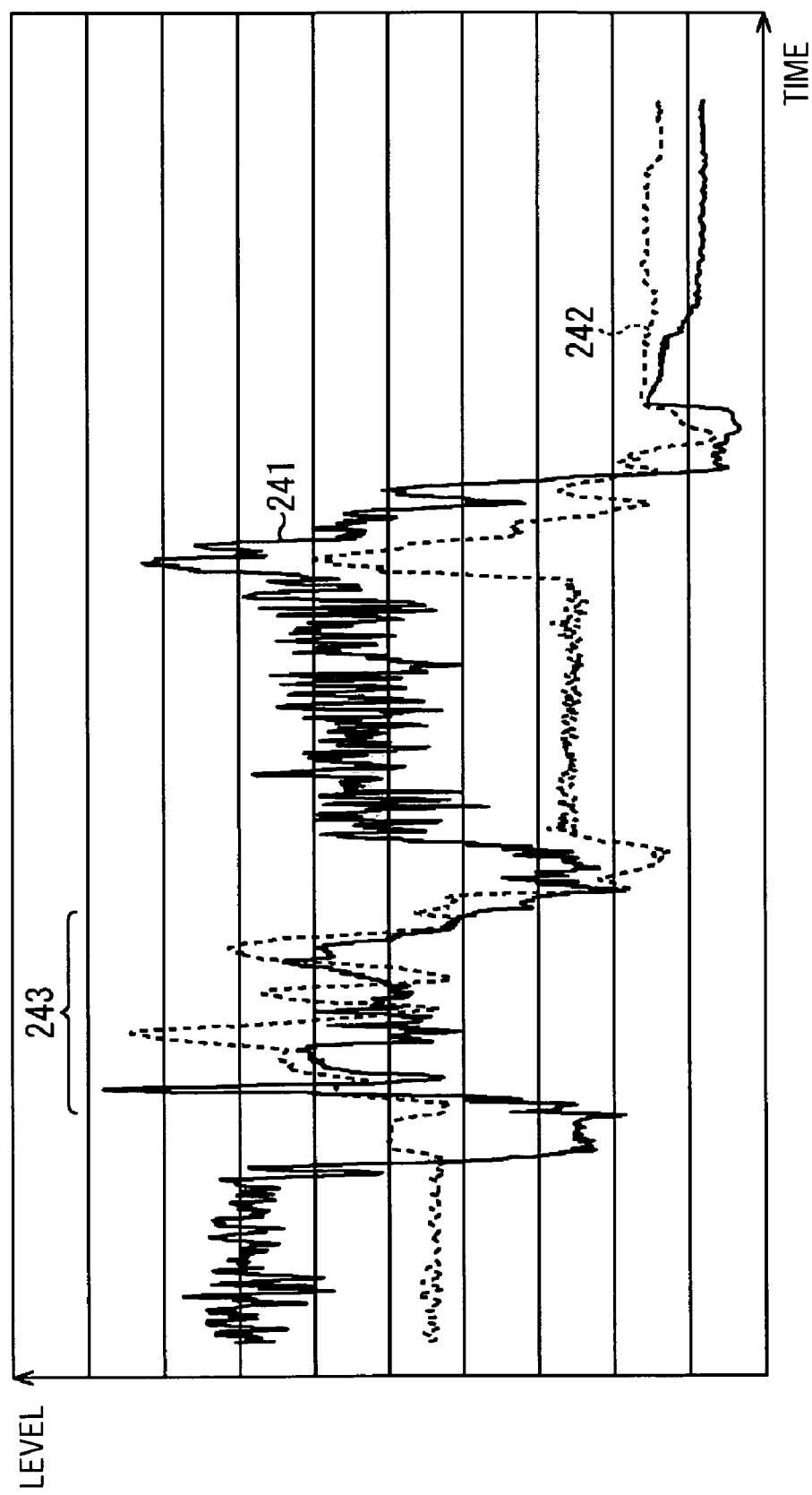
FIG. 15 illustrates a high-definition image of an oscillating flower as a subject.
Figure 16:
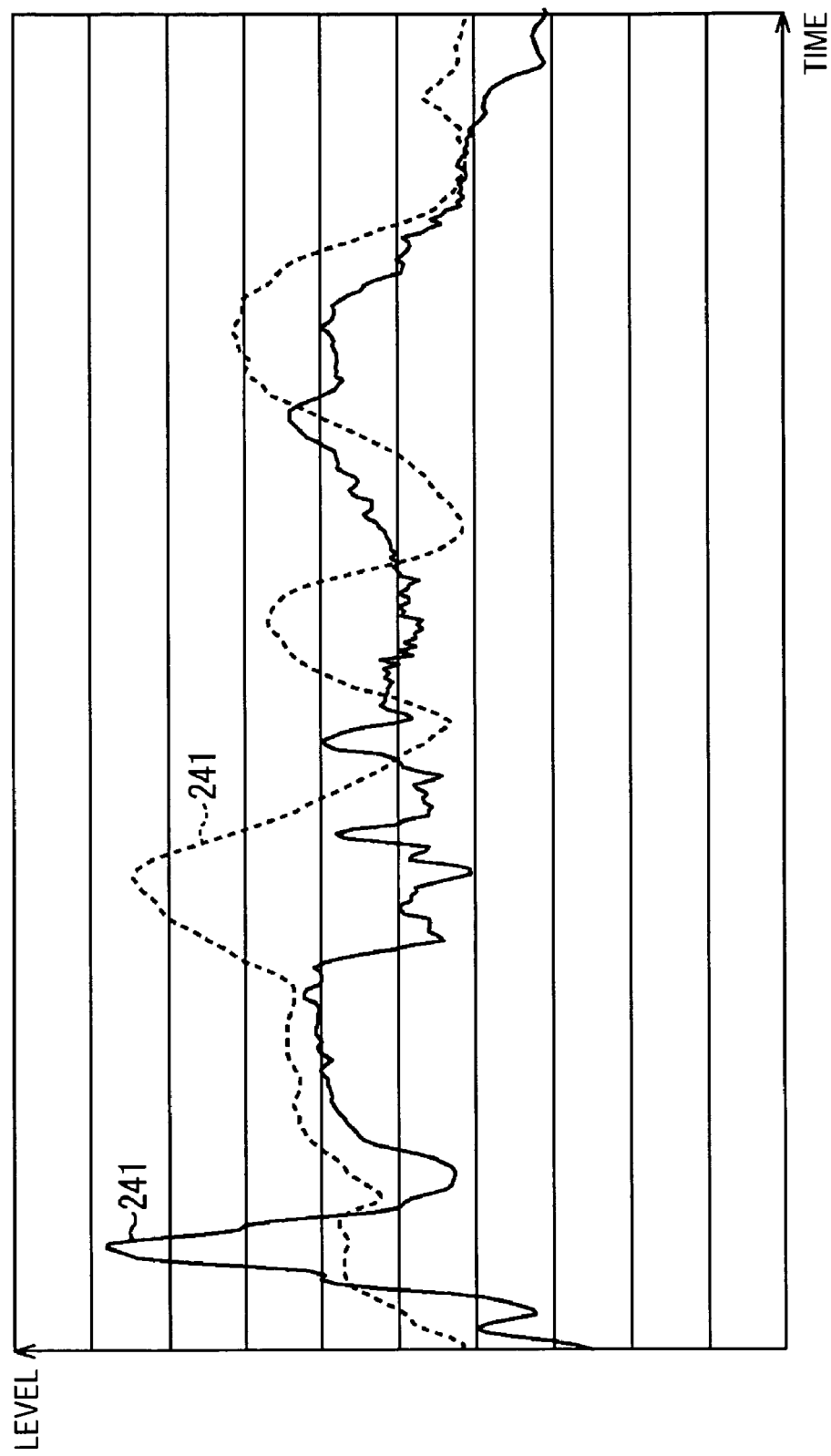
FIG. 16 illustrates data of the swinging flower as a subject.

FIGS. 14 through 16 show specific examples of the assessment value and the integrated luminance value. FIG. 14 shows a plot of variations in the assessment value and the integrated luminance value of a special subject (mirror ball) that is moved in focus position while being photographed. As shown, variations of the assessment value are represented as an assessment value 231 and variations of the integrated luminance value are represented as an integrated luminance value 232. The assessment value 231 increases and reaches a general peak at an in-focus point represented by an arrow-headed line 233. The integrated luminance value 232 has no general peak at the in-focus point. However, the local peaks of the assessment value (high-frequency component peaks) match (are synchronized with) the local peaks of the integrated luminance value (high-frequency peaks) in number and position.

FIG. 15 shows a plot of the assessment value and the integrated luminance value of an ordinary subject (oscillating flower) that is moved in focus position while being photographed at the same time. As shown, variations of the assessment value are represented as an assessment value 241 and variations of the integrated luminance value are represented as an integrated luminance value 242. As shown in FIG. 15, the local peaks of the assessment value 241 fail to match the local peaks of the integrated luminance value 242 in terms of count and position. FIG. 16 is an enlarged plot of a portion 243 of FIG. 15. As shown in FIG. 16, the local peaks of the assessment value and the local peaks of the integrated luminance value are distinctly shown to be unsynchronized.

As described above, the local peaks of the assessment value and the integrated luminance value are synchronized only in a special subject such as a mirror ball (within a detectable level range) while the local peaks of the assessment value and the integrated luminance value are not synchronized in an ordinary subject such as an oscillating flower (within a detectable level range). The mode selector 96 compares the local peak of the assessment value with the local peak of the integrated luminance value (in terms of count and position) to determine synchronization. The mode selector 96 thus more accurately determines whether the subject is one of a mirror ball and sunlight dappled through leaves of trees than with the known determination method based on the variations of the integrated luminance value only. The long-filter mode is correctly applied in the peak searching. The image pickup apparatus 50 thus more accurately determines the subject, thereby performing the AF control process more appropriately.

With the long-filter mode applied, the long-filter mode peak searcher 98 of FIG. 3 controls the driver controller 64 in response to a command from the mode selector 96, thereby performing the long-filter mode peak search process.

During the long-filter mode peak search process, moving average calculation (with 11 stages) is performed on normalized luminance assessment value on a per field basis, and maximum value updating process is performed. When the normalized luminance assessment value becomes half the maximum value, or when the end of searching is reached, a next process resumes. If the determination process has already performed once, the calculation of the in-focus position is performed. If the number of turns is zero, the movement direction setting process is performed, and then moving direction is reversed.

The normalized luminance assessment value is determined by multiplying the assessment value (IIR1-W1-HPeak) by the moving average of 32 Y luminance additive values (Y-W1-Hintg); and then dividing the result by the moving average of 3 Y luminance additive values (Y-W1-Hintg). The multiplication of the moving average of 32 Y luminance additive values (Y-W1-Hintg)/ the moving average of 3 Y luminance additive values (Y-W1-Hintg) is performed to reduce the effect of intense light reflected from the mirror ball.

Figure 17A:
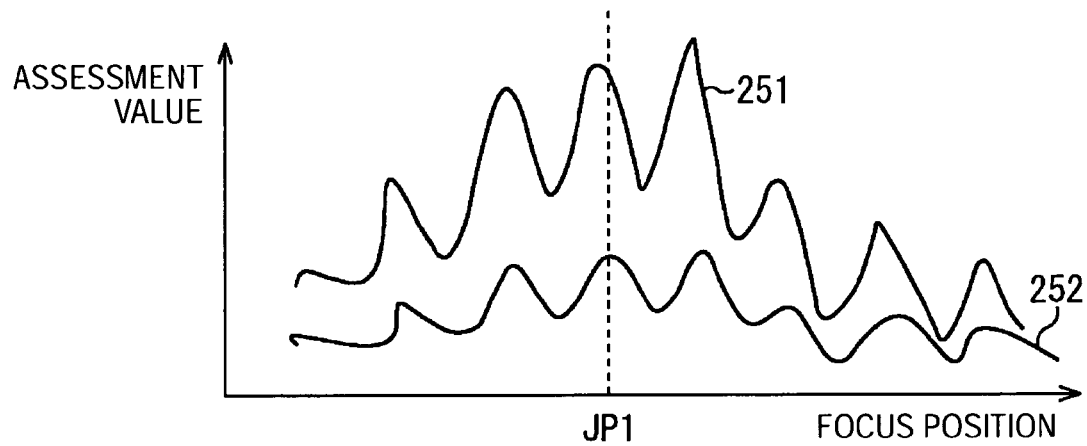
FIGS. 17A and 17B illustrate a peak search method with the assessment value varying greatly.
Figure 17B:
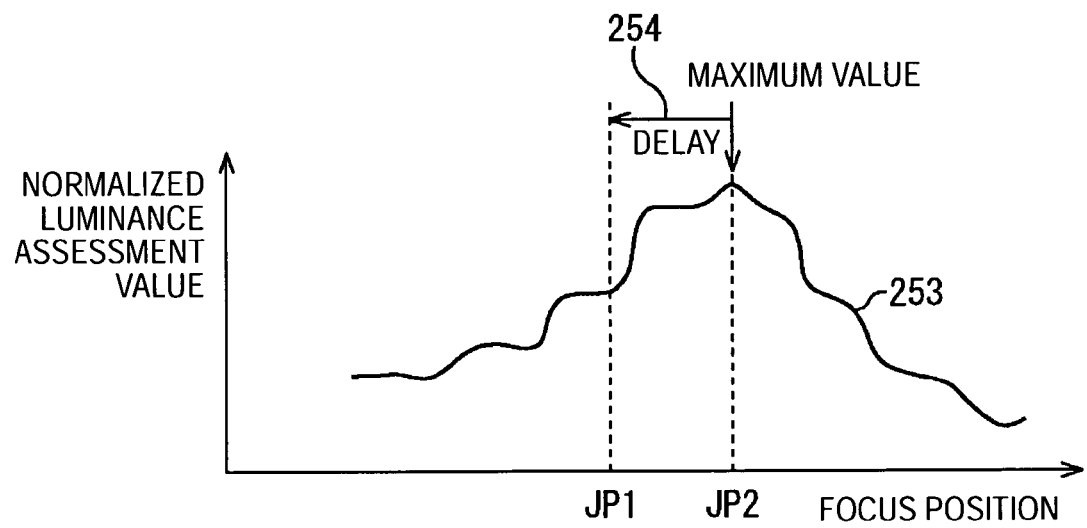

FIGS. 17A and 17B show plots of the above-mentioned calculation results. As shown in FIG. 17A, a waveform 251 represents a greatly varying assessment value, and a waveform 252 is determined by multiplying the waveform 251 by the quotient of the moving average of 32 Y luminance additive values / the moving average of 3 Y luminance additive values. Focus position JP1 refers to a field where a peak is reached over the entire assessment value. As shown in FIG. 17B, a waveform 253 represents a variation of the normalized luminance assessment values obtained by taking the moving average of 11 values of the waveform 252. By taking the moving average, the variations (high-frequency components) are reduced and the general peak (JP2) is easily compared with the waveform 251 (more accurate peak searching is performed with the possibility of erratic detection reduced). However, by taking the moving average (11 stages), the peak position of the assessment value is delayed by 5 fields. The calculation of the peak position is thus performed taking into consideration the delay of 5 fields.

FIG. 18 illustrates the movement of the focus lens 61 in the long-filter mode peak searching. As represented by an arrow-headed line 261, the focus lens 61 starts moving at a constant speed when the peak search process starts. Since the focus lens 61 moves in a direction in which the normalized luminance assessment value decreases, the maximum value and the position of the maximum value remain unchanged from those at the start point. Without returning, the focus lens 61 continuously moves to a point where the normalized luminance assessment value becomes half the maximum value, and then turns and starts moving again from that point.

As represented by an arrow-headed line 262, the focus lens 61 moves at a constant speed, and further moves passing a normalized assessment value peak. When the normalized luminance assessment value reaches half the maximum value, the peak position is calculated because the focus lens 61 has already turned. As represented by an arrow-headed line 263, the focus lens 61 reaches the peak position, thereby completing the long-filter process.

When the subject is determined as being a special subject, such as a mirror ball or sunlight dappled through the tree leaves, the above-described long-filter mode peak search is performed. The image pickup apparatus 50 thus more accurately determines the subject, thereby performing the AF control process more appropriately.

The above-described process is described below. The focus process by the image pickup apparatus 50 is described below with reference to a flowchart of FIG. 19.

In step S1, the image pickup apparatus 50 performs a preparation process. The preparation process will be described later in detail with reference to a flowchart of FIG. 20. In step S2, the assessment local peak searcher 92 performs an assessment value local peak search process. The assessment value local peak search process will be described below with reference to a flowchart of FIG. 21. In step S3, the integrated luminance value local peak searcher 94 performs an integrated luminance value local peak search process. The integrated luminance value local peak search process will be described below with reference to a flowchart of FIG. 22. In step S4, the local peak comparator 95 performs a local peak comparison process. The local peak comparison process will be described below with reference to a flowchart of FIG. 23.

In step S5, the mode selector 96 selects between the standard mode and the long-filter mode as the peak search mode based on the comparison process result obtained in step S4. In step S6, the mode selector 96 determines whether to perform the standard mode peak search with the standard mode selected in step S5. If the standard mode is selected, processing proceeds to step S7. In step S7, the standard mode peak searcher 97 performs the standard mode peak search process, thereby completing the focus process at the end of the standard mode peak search process. If it is determined in step S6 that the peak search is not to be performed in the standard mode, the mode selector 96 proceeds to step S8. In step S8, the long-filter mode peak searcher 98 performs the long-filter mode peak search process, thereby completing the focus process at the end of the long-filter mode peak search process. The long-filter mode peak search process performed in step S8 will be described below with reference to a flowchart of FIG. 24.

Figure 19:
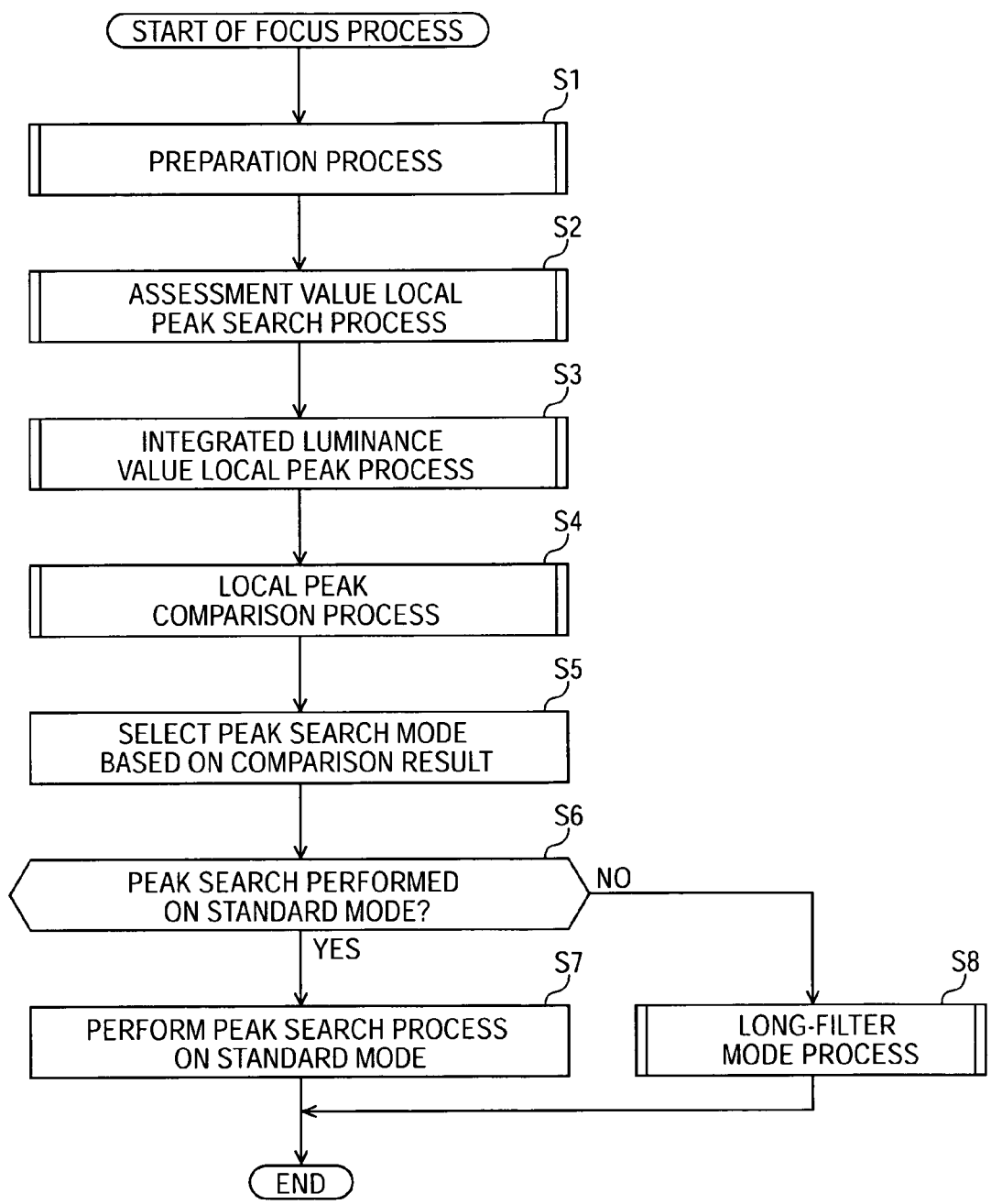
FIG. 19 is a flowchart of a focus process.
Figure 20:
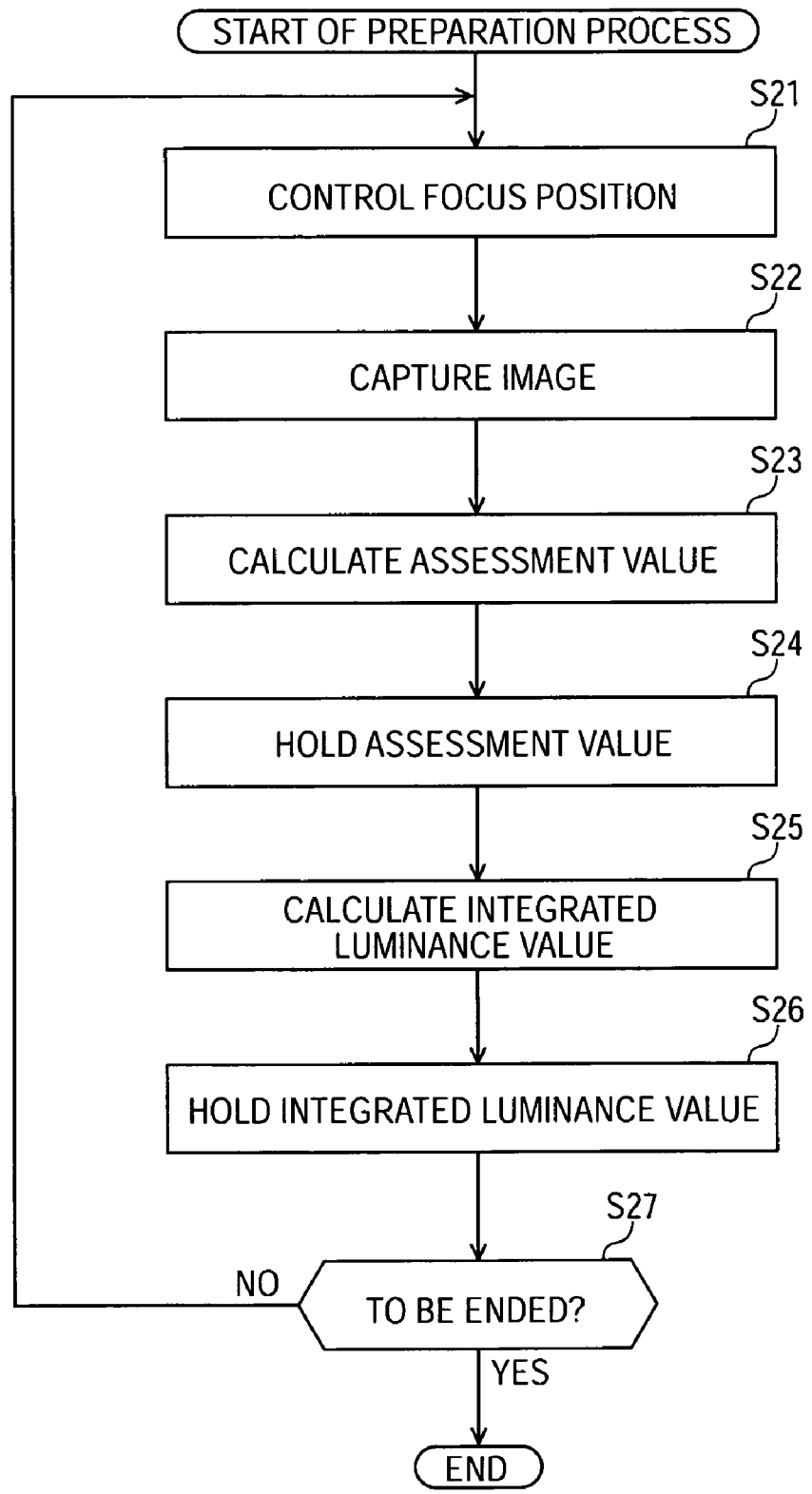
FIG. 20 is a flowchart of a preparation process.

The preparation process performed in step S1 of FIG. 19 is described below with reference to the flowchart of FIG. 20.

In step S21, the driver controller 64 controls the position of the focus lens 61 by controlling the lens driver 63, and thus controls the focus position. In step S22, the CCD 71 photoelectrically converts light incident thereon to capture an image of a subject. The captured image is then supplied to the assessment value calculator 81 and the integrated luminance value calculator 82 as a video signal. In step S23, the assessment value calculator 81 calculates the assessment value. In step S24, the assessment value holder 91 holds the assessment value. In step S25, the integrated luminance value calculator 82 calculates the integrated luminance value based on the supplied video signal. In step S26, the integrated luminance value holder 93 holds the integrated luminance value. In step S27, the driver controller 64 determines whether to end the preparation process. If it is determined in step S27 that the preparation process is to be ended, the driver controller 64 ends the preparation process. Processing proceeds to step S1 of FIG. 19, and step S2 and subsequent steps are then performed.

If it is determined in step S27 that the preparation process is not to be ended, the driver controller 64 returns to step S21 to repeat step S21 and subsequent steps.

Figure 21:
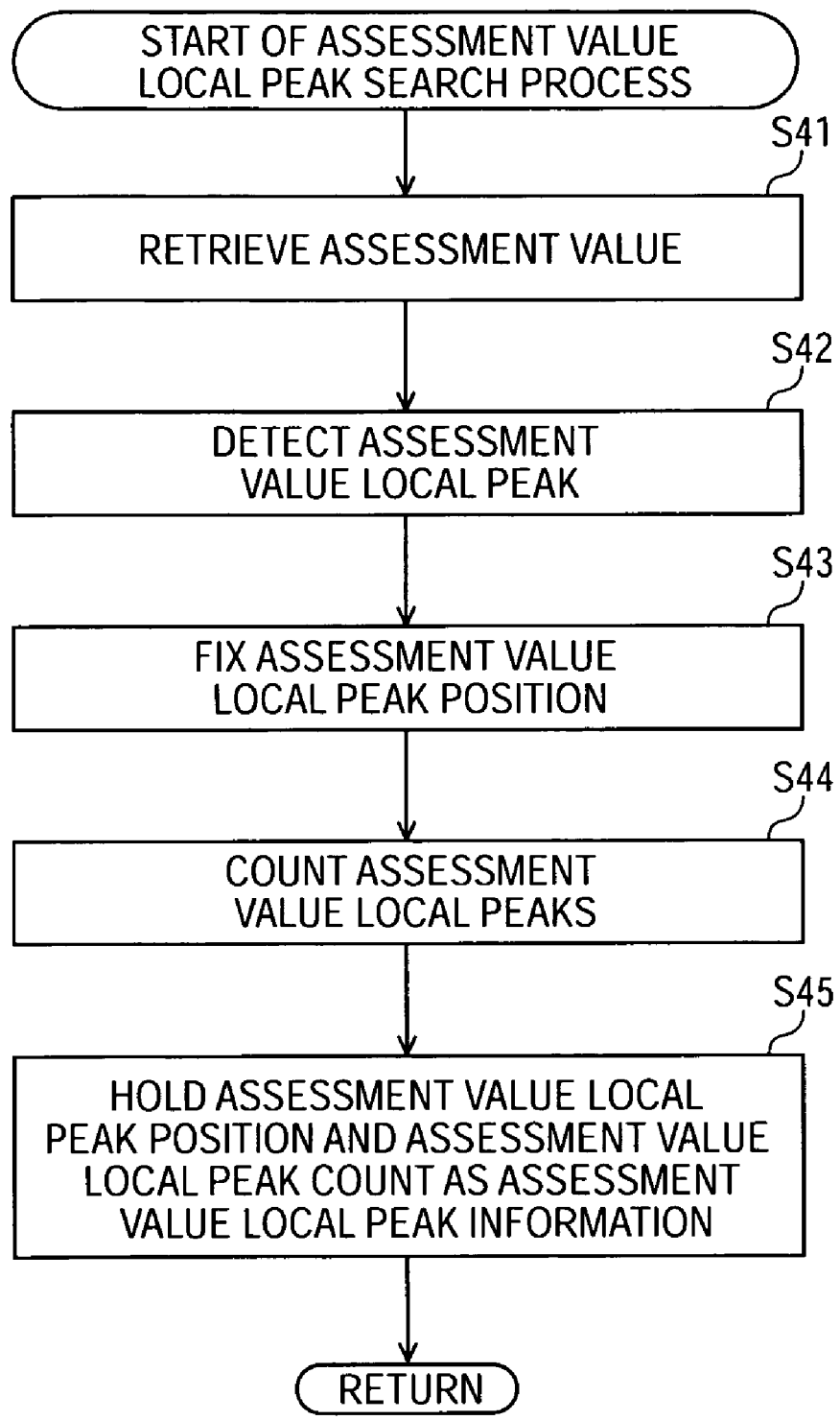
FIG. 21 is a flowchart of an assessment value local peak search process.

The assessment value local peak search process performed in step S2 of FIG. 19 is described below with reference to the flowchart of FIG. 21.

In step S41, the assessment value acquisition unit 171 of FIG. 6 retrieves the assessment value. In step S42, the assessment value local peak detector 172 detects the assessment value local peak. In step S43, the assessment value local peak position fixer 173 fixes the assessment value local peak position. In step S44, the assessment value local peak counter 174 counts the assessment value local peaks. In step S45, the assessment value local peak information holder 175 holds, as the assessment value local peak information, the assessment value local peak position and the assessment value local peak count to end the assessment value local peak search process. Processing returns to step S2 of FIG. 19 to repeat step S3 and subsequent steps.

Figure 22:
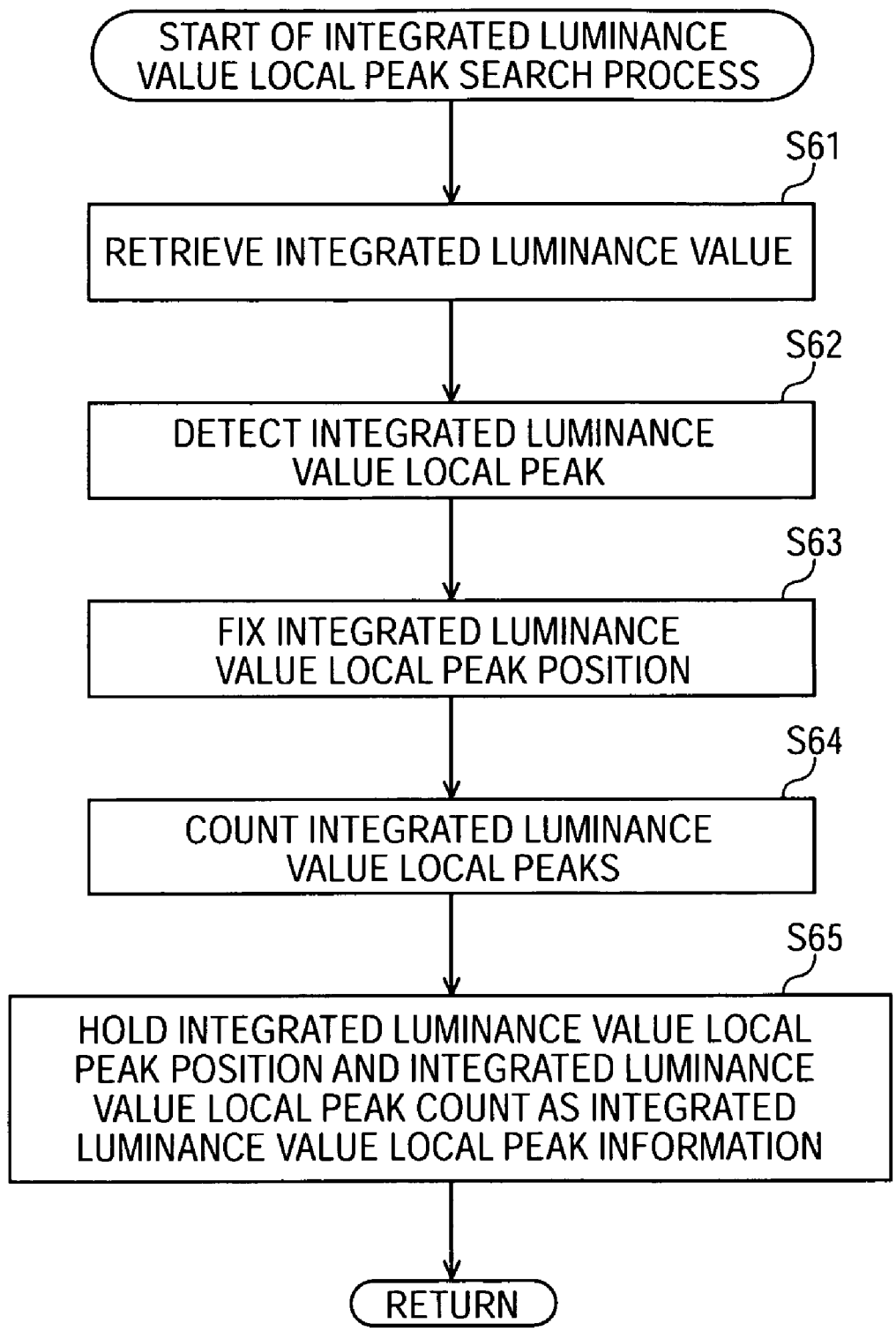
FIG. 22 is a flowchart of an integrated luminance value local peak search process.

The integrated luminance value local peak search process performed in step S3 of FIG. 19 is described below with reference to the flowchart of FIG. 22.

In step S61, the integrated luminance value acquisition unit 181 of FIG. 6 retrieves the integrated luminance value. In step S62, the integrated luminance value local peak detector 182 detects the integrated luminance value local peak. In step S63, the integrated luminance value local peak fixer 183 fixes the integrated luminance value local peak position. In step S64, the integrated luminance value local peak counter 184 counts the integrated luminance value local peaks. In step S65, the integrated luminance value local peak information holder 185 holds, as the integrated luminance value local peak information, the integrated luminance value local peak position and the integrated luminance value local peak count to end the integrated luminance value local peak search process. Processing returns to step S3 of FIG. 19 to perform step S4 and subsequent steps.

Figure 23:
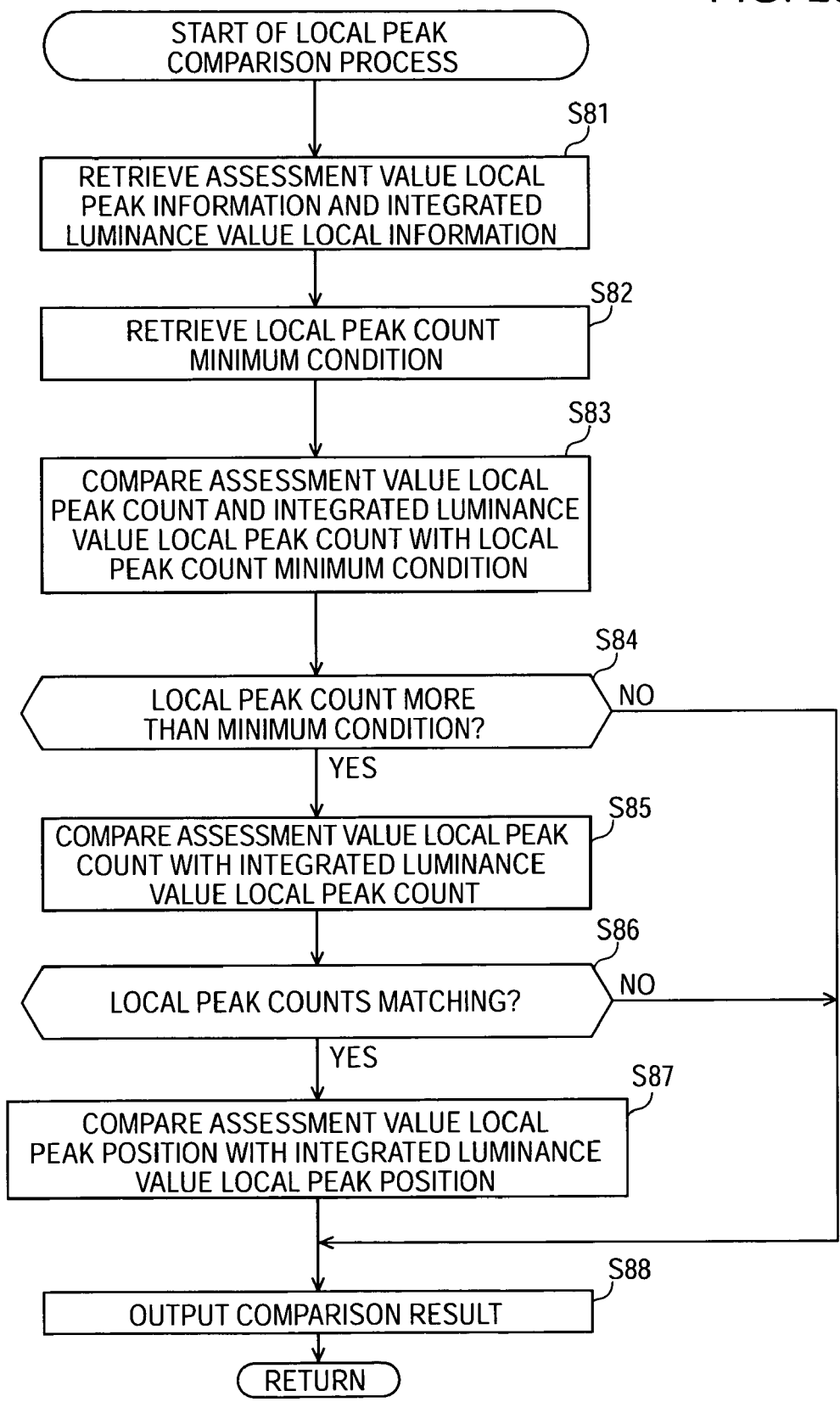
FIG. 23 is a flowchart illustrating a local peak comparison process.

The local peak comparison process performed in step S4 of FIG. 19 is described below with reference to the flowchart of FIG. 23.

In step S81, the local peak count minimum condition verifier 191 retrieves the assessment value local peak information and the integrated luminance value local peak information. In step S82, the local peak count minimum condition verifier 191 retrieves the local peak count minimum condition from the local peak count minimum condition holder 192. In step S83, the local peak count minimum condition verifier 191 compares the assessment value local peak count and the integrated luminance value local peak count with the local peak count minimum condition.

In step S84, the local peak count minimum condition verifier 191 determines whether the local peak count is more than the minimum condition. If it is determined in step S84 that the local peak count is more than the minimum condition, the local peak count minimum condition verifier 191 proceeds to step S85. In step S85, the local peak count comparator 193 compares the assessment value local peak count with the integrated luminance value local peak count. In step S86, the local peak count comparator 193 determines the two local peak counts match. If it is determined in step S86 that the two local peak counts match, the local peak count comparator 193 proceeds to step S87. In step S87, the local peak position comparator 194 compares the assessment value local peak position with the integrated luminance value local peak position.

If it is determined in step S84 that the local peak count is less than the minimum condition, i.e., that a sufficient number of local peaks cannot be detected, the local peak count minimum condition verifier 191 proceeds to step S88. If it is determined in step S86 that the local peak counts fail to match, the local peak count comparator 193 proceeds to step S88.

In step S88, the comparison result output unit 195 outputs the comparison result and returns to step S4 of FIG. 19 to perform step S5 and subsequent steps.

Figure 24:
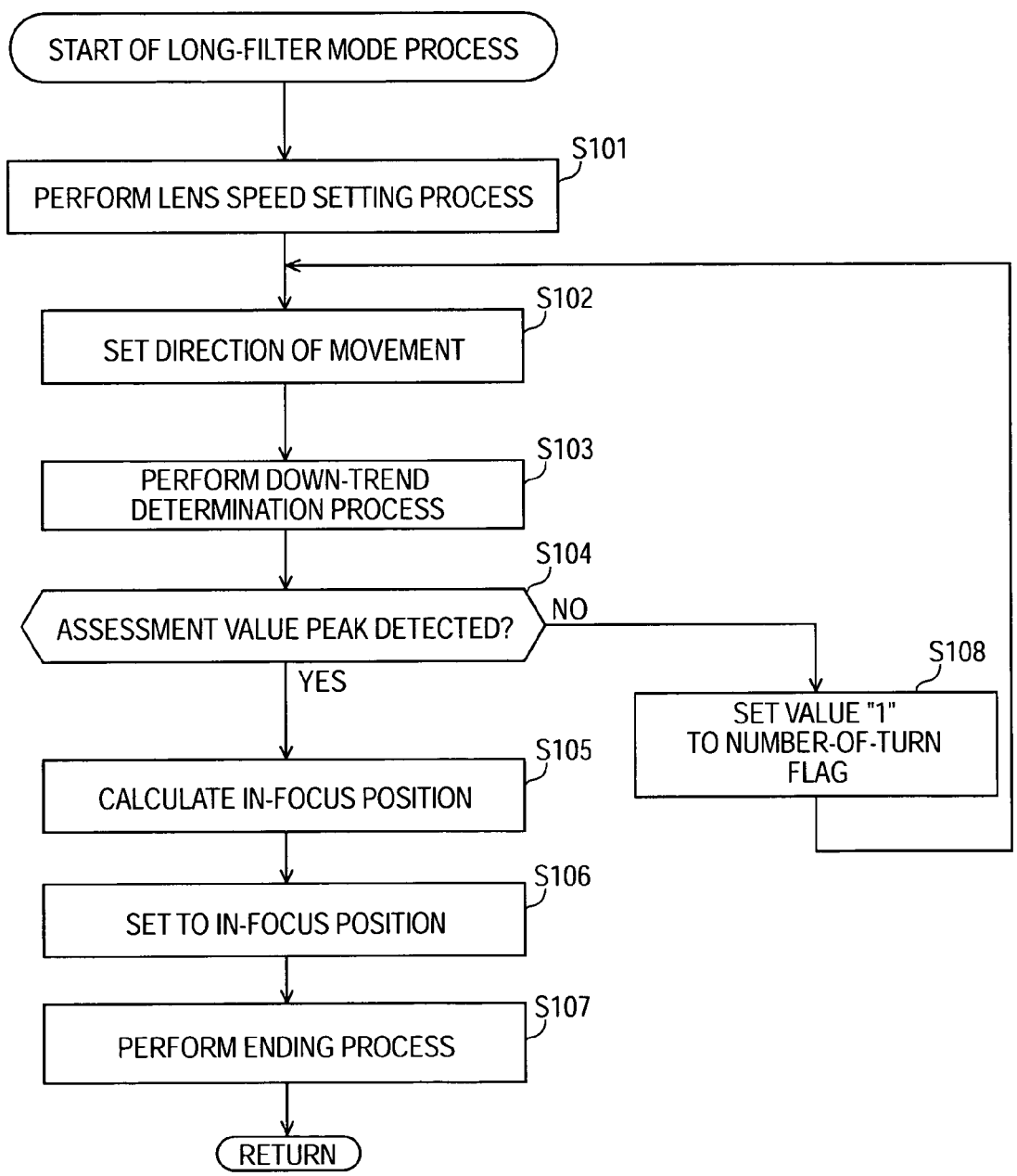
FIG. 24 is a flowchart illustrating a long-filer mode process.

The long-filter mode process performed in step S8 of FIG. 19 is described below with reference to the flowchart of FIG. 24.

After starting the long-filter mode process for searching a peak in the long-filter mode, the long-filter mode peak searcher 98 performs a lens speed setting process for setting the speed of the focus lens 61 in step S101. In step S102, the long-filter mode peak searcher 98 sets the direction of movement of (the focus position of) the focus lens 61. In step S103, the long-filter mode peak searcher 98 performs a down-trend determination process (to detect that a peak of the assessment value has been passed) using the normalized luminance assessment value and the moving average (of 11 stages).

In step S104, the long-filter mode peak searcher 98 determines whether the current assessment value becomes half the maximum value candidate, or whether the searching position reaches the end of the assessment value. The long-filter mode peak searcher 98 also determines whether the number of turns in the searching operation is 1. The long-filter mode peak searcher 98 thus determines whether the assessment value peak has been detected or not by determining whether the current assessment value is lower than half the maximum value candidate with the number of turn being equal to 1 or more, or by determining whether the searching position reaches the end of the assessment value with the number of turns being equal to 1 or more. When the assessment value peak is detected (namely, the current assessment value is lower than half the maximum value candidate with the number of turn being equal to 1 or more or the searching position reaches the end of the assessment value with the number of turns being equal to 1 or more), the long-filter mode peak searcher 98 proceeds to step S105 to calculate the in-focus position (with the subject in-focus state). Processing proceeds to step S106 to set the image pickup apparatus 50 to the in-focus position. In step S107, an ending process is performed. The long-filter mode process is thus completed. Processing returns to step S8 of FIG. 19 to end the focus process.

If it is determined in step S104 that the assessment value peak is not detected (namely, the current assessment value is higher than half the maximum value candidate with the number of turn being equal to 0 or the searching position has not reached the end of the assessment value with the number of turns being equal to 0), the long-filter mode peak searcher 98 sets "1" to the number-of-turn flag and then returns to step S102 to repeat step S102 and subsequent steps.

The image pickup apparatus 50 operates in this way. The image pickup apparatus 50 thus more accurately determines whether the subject is one of a mirror ball and sunlight dappled through leaves of trees than with the known determination method based on the variations of the integrated luminance value only. The long-filter mode is correctly applied in the peak searching. The image pickup apparatus 50 thus more accurately determines the subject, thereby performing the AF control process more appropriately.

The above-described process steps may be performed using hardware or software. If the process steps are performed using software, a computer program forming the software can be installed from a recording medium or via a network.

The recording medium may include the removable medium 107 that is supplied separate from the apparatus body to supply the user with the computer program. The recording medium may also include the ROM 101 or the recording unit 104 (including a hard disk), each of which stores the computer program and is supplied in the apparatus body to the user.

The process steps forming the computer program stored on the recording medium can be performed in the sequential time-series order stated herein. Alternatively, the process steps may be performed in parallel or separately.

The apparatus described herein can be split among a plurality of units. Alternatively, an arrangement described as a plurality of units can be integrated into a single apparatus. An element, which is not described above, can be added to the system. As long as the entire apparatus remains unchanged in structure and operation, a portion of one unit can be included into another unit.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus for controlling a driver driving an optical element of an image pickup device to adjust a focus position of the image pickup device in the capturing of an image of a subject, the control apparatus comprising:

local peak comparing means for comparing a local peak of an assessment value, as a parameter for adjusting the focus position, with a local peak of an integrated luminance value, the assessment value assessing an out-of-focus level of the captured image of the subject on a per field image basis, the integrated luminance value being obtained by integrating a luminance value of the captured image of the subject on a per field image basis, and the local peak comparing means compares the local peak of the assessment value with the local peak of the integrated luminance value in terms of peak position and peak count; and mode selecting means for selecting, from among a plurality of prepared modes, a mode searching for a peak over the entire range of the assessment value based on the comparison result provided by the local peak comparing means.

2. The control apparatus according to claim 1, wherein the mode selecting means identifies the subject as a special subject instantaneously emitting light and selects a mode corresponding to the special subject if the local peak of the assessment value matches the local peak of the integrated luminance value in terms of peak position and peak count, and identifies the subject as an ordinary subject and selects a mode corresponding to the ordinary subject if the local peak of the assessment value fails to match the local peak of the integrated luminance value in terms of peak position and peak count.

3. The control apparatus according to claim 1, further comprising:

assessment value calculating means for calculating the assessment value; and integrated luminance value calculating means for calculating the integrated luminance value, wherein the local peak comparing means compares the local peak of the assessment value calculated by the assessment value calculating means with the local peak of the integrated luminance value calculated by the integrated luminance value calculating means.

4. The control apparatus according to claim 1, further comprising:

assessment value local peak detecting means for detecting the local peak of the assessment value calculated by the assessment value calculating means; and integrated luminance value local peak detecting means for detecting the local peak of the integrated luminance value calculated by the integrated luminance value calculating means, wherein the local peak comparing means compares the local peak of the assessment value detected by the assessment value local peak detecting means with the local peak of the integrated luminance value detected by the integrated luminance value local peak detecting means.

5. The control apparatus according to claim 1, further comprising peak search means for searching for a peak over the entire range of the assessment value in a mode selected by the mode selecting means.

6. A control method of a control apparatus for controlling a driver driving an optical element of an image pickup device to adjust a focus position of the image pickup device in the capturing of an image of a subject, the control method comprising:

comparing a local peak of an assessment value, as a parameter for adjusting the focus position, with a local peak of an integrated luminance value, the assessment value assessing an out-of-focus level of the captured image of the subject on a per field image basis, the integrated luminance value being obtained by integrating a luminance value of the captured image of the subject on a per field image basis, and comparing the local peak of the assessment value with the local peak of the integrated luminance value in terms of peak position and peak count; and selecting, from among a plurality of prepared modes, a mode searching for a peak over the entire range of the assessment value based on the comparison result provided in the local peak comparison step.

7. A computer readable storage medium encoded with computer program instructions which when executed by a computer cause a processor to execute a method to control a driver driving an optical element of an image pickup device to adjust a focus position of the image pickup device in the capturing of an image of a subject, method comprising:

comparing a local peak of an assessment value, as a parameter for adjusting the focus position, with a local peak of an integrated luminance value, the assessment value assessing an out-of-focus level of the captured image of the subject on a per field image basis, the integrated luminance value being obtained by integrating a luminance value of the captured image of the subject on a per field image basis, and comparing the local peak of the assessment value with the local peak of the integrated luminance value in terms of peak position and peak count; and selecting, from among a plurality of prepared modes, a mode searching for a peak over the entire range of the assessment value based on the comparison result provided in the local peak comparison step.

8. A camera having an image pickup device for capturing an image of a subject, and a driver for driving an optical element of the image pickup device to adjust a focus position of the image pickup device in the capturing of the image of the subject, the camera comprising:

local peak comparing means for comparing a local peak of an assessment value, as a parameter for adjusting the focus position, with a local peak of an integrated luminance value, the assessment value assessing an out-of-focus level of the captured image of the subject on a per field image basis, the integrated luminance value being obtained by integrating a luminance value of the captured image of the subject on a per field image basis, and the local peak comparing means compares the local peak of the assessment value with the local peak of the integrated luminance value in terms of peak position and peak count;

mode selecting means for selecting, from among a plurality of prepared modes, a mode searching for a peak over the entire range of the assessment value based on the comparison result provided by the local peak comparing means; and peak searching means for searching for the peak over the entire range of the assessment value by controlling the driver in the mode selected by the mode selecting means.

9. A control apparatus for controlling a driver driving an optical element of an image pickup device to adjust a focus position of the image pickup device in the capturing of an image of a subject, the control apparatus comprising:

a local peak comparing unit comparing a local peak of an assessment value, as a parameter for adjusting the focus position, with a local peak of an integrated luminance value, the assessment value assessing an out-of-focus level of the captured image of the subject on a per field image basis, the integrated luminance value being obtained by integrating a luminance value of the captured image of the subject on a per field image basis, and the local peak comparing unit compares the local peak of the assessment value with the local peak of the integrated luminance value in terms of peak position and peak count; and a mode selecting unit selecting, from among a plurality of prepared modes, a mode searching for a peak over the entire range of the assessment value based on the comparison result provided by the local peak comparing unit.

10. A camera having an image pickup device for capturing an image of a subject, and a driver for driving an optical element of the image pickup device to adjust a focus position of the image pickup device in the capturing of the image of the subject, the camera comprising:

a local peak comparing unit comparing a local peak of an assessment value, as a parameter for adjusting the focus position, with a local peak of an integrated luminance value, the assessment value assessing an out-of-focus level of the captured image of the subject on a per field image basis, the integrated luminance value being obtained by integrating a luminance value of the captured image of the subject on a per field image basis, and the local peak comparing unit compares the local peak of the assessment value with the local peak of the integrated luminance value in terms of peak position and peak count;

a mode selecting unit selecting, from among a plurality of prepared modes, a mode searching for a peak over the entire range of the assessment value based on the comparison result provided by the local peak comparing unit; and a peak searching unit searching for the peak over the entire range of the assessment value by controlling the driver in the mode selected by the mode selecting unit.

* * * * *